(12) United States Patent
Hsu

(10) Patent No.: US 8,887,881 B2
(45) Date of Patent: Nov. 18, 2014

(54) REAR SHOCK-ABSORBING DEVICE

(75) Inventor: Jung Yu Hsu, Tainan (TW)

(73) Assignee: Kind Shock Hi-Tech Co., Ltd., Tainan (TW)

( * ) Notice: Subject to any disclaimer, the term of this patent is extended or adjusted under 35 U.S.C. 154(b) by 489 days.

(21) Appl. No.: 13/103,202

(22) Filed: May 9, 2011

(65) Prior Publication Data

US 2012/0049427 A1 Mar. 1, 2012

(30) Foreign Application Priority Data

Sep. 1, 2010 (TW) .............................. 99216881 U

(51) Int. Cl.
| | |
|---|---|
| *F16F 9/24* | (2006.01) |
| *F16F 9/44* | (2006.01) |
| *F16F 9/516* | (2006.01) |
| *F16F 9/06* | (2006.01) |
| *F16F 7/00* | (2006.01) |

(52) U.S. Cl.
CPC . *F16F 9/063* (2013.01); *F16F 9/44* (2013.01); *F16F 9/5165* (2013.01)
USPC ............ 188/297; 188/286; 188/313; 188/316

(58) Field of Classification Search
USPC ............ 188/297, 313, 314, 315, 316, 322.13, 188/322.15, 322.16, 286; 267/217, 218
See application file for complete search history.

(56) References Cited

U.S. PATENT DOCUMENTS

| | | | | |
|---|---|---|---|---|
| 4,099,602 | A * | 7/1978 | Kourbetsos | 188/300 |
| 2002/0175035 | A1* | 11/2002 | Achenbach | 188/315 |
| 2005/0199457 | A1* | 9/2005 | Beck | 188/314 |
| 2008/0164111 | A1* | 7/2008 | Inoue et al. | 188/297 |
| 2010/0224456 | A1* | 9/2010 | McAndrews et al. | 188/314 |
| 2011/0221108 | A1* | 9/2011 | Uchiyama | 267/217 |
| 2012/0247893 | A1* | 10/2012 | Gonzalez et al. | 188/313 |

FOREIGN PATENT DOCUMENTS

JP 5872742 A * 4/1983

* cited by examiner

*Primary Examiner* — Melody Burch
(74) *Attorney, Agent, or Firm* — Rosenberg, Klein & Lee

(57) ABSTRACT

A shock-absorbing device includes a first cylinder with a first room defined therein and a room is defined in an end of the first cylinder. A second cylinder extends into the first cylinder and has a first piston so as to define a third room and a third room. Hydraulic liquid is filled in the second and third rooms. A first tube and a second tube extending through the first tube are located in the first room. A first path and a second path communicate with the recess. The first and second tubes extend into the second cylinder and are connected to the first piston. When the first and second cylinders are relative moved, the hydraulic liquid is controlled to flow or not flow between the first and second paths so as to absorb different levels of shocks, and the speed that the shock-absorbing device returns can be adjusted.

15 Claims, 29 Drawing Sheets

REAR SHOCK-ABSORBING DEVICE

FIELD OF THE INVENTION

The present invention relates to a rear shock-absorbing device, and more particularly, to a bicycle rear shock-absorbing device having multiple paths for the hydraulic liquid flowing therethrough to absorb larger shocks and increasing return speed of the shock-absorbing device.

BACKGROUND OF THE INVENTION

The conventional shock-absorbing device for bicycles is focused on absorbing shocks transferred from the road to improve the comfort of the users in the vehicle.

The bicycle shock-absorbing devices include the front shock-absorbing device and the rear shock-absorbing device, and both of which can be operated by hydraulic or pneumatic media, or both.

Taiwan Utility Model Patent Application No. 098217431 discloses a first cylinder having a first installation end and a first open end, wherein the first installation end is connected to the bicycle frame. A piston rod is received in the first installation end. The piston rod includes a first end and a second end, wherein the first end is connected to the first installation end and the second end of the piston rod is connected with a first piston. A second cylinder has a second installation end second open end, wherein the second installation end is connected to the bicycle. The second cylinder has liquid received therein and the second open end of the second cylinder smoothly extends into the first open end of the first cylinder. The second end of the piston rod and the first piston smoothly extend into the second open end of the second cylinder. The second open end of the second cylinder is connected with a second piston and a room is defined in the first cylinder and located between the second piston and the first installation end. A spring is located in the room and includes a first end and a second end. The first end of the spring contacts the first cylinder and the second end of the spring contacts the second cylinder. A biasing member is located in the room in the first cylinder.

U.S. Pat. No. 7,607,522 discloses a shock-absorbing device which has a main piston, and a piston rod extends through the main piston and located between two tubes sharing a common center. The two tubes have liquid received therein. The main piston has a compression portion and an expanding portion, and the two tubes include an interior portion and an exterior portion. A valve is located to control the liquid. A first adjustment device is connected to the compression portion and a second adjustment device is connected to the expanding portion. A first pressurizing device uses a piston to compress the media and separate the liquid. The second adjustment device further includes a first valve and a first non-one-way valve. The first valve and the first non-one-way valve are located in a pipe which is located between the compression portion and the first pressurizing device. A second valve and a second non-one-way valve are located in another pipe which is located between the expanding portion and the first pressurizing device.

In the first example, the biasing member and the spring are compressed to absorb the shocks. When the shock-absorbing device expands, the biasing member and the spring separate the first and second cylinders, and the piston rod moves relative to the second cylinder to provide damping effect. The second example uses the movement of the main piston and the piston rod to provide different damping effects when the shocks are applied to the shock-absorbing device. The adjustment device adjusts the damping coefficient to provide the ideal shock-absorbing result.

However, the liquid in the second cylinder which is a single cylinder and the spring has fixed spring force, so that when minor shocks are applied to the shock-absorbing device of the first example, the spring is not responsive to the minor shocks which are transferred to the cyclist directly. For the second example, the shock-absorbing features can be adjusted by the two tubes and the adjusting device to respond to the large or minor shocks. The speeds that the rear shock-absorbing device expands and retracts are the same. In other words, when operation, the change of the shock-absorbing device is too fast that makes the cyclist feel uncomfortable. Besides, the shock-absorbing device involves complicated structure which is difficult to manufactured and heavy. The two tubes have leakage problem which makes the shock-absorbing device cannot function as desired.

The present invention intends to provide a shock-absorbing device which improves the shortcomings of the existed shock-absorbing devices.

SUMMARY OF THE INVENTION

The present invention relates to a rear shock-absorbing device and comprises a first cylinder having a first room defined therein and a first installation unit is connected to an end of the first cylinder. The first installation unit is connected to a bicycle frame and a recess is defined in the first installation unit. A second cylinder extends into the first room and has a second installation unit connected end thereof. The second installation unit is connected to the bicycle frame. A first piston is located in the second cylinder so as to define a second room and a third room. The second room is located close to the second installation unit. Hydraulic liquid is filled in the second and third rooms. A ring is connected to an open end of the second cylinder and located away from the second installation unit. A first tube is a hollow tube and extends through the center of the first room. The first tube has a first end connected with the first installation unit and a second end of the first tube extends through the second cylinder and the ring, and is connected to the first piston. A side hole is defined through the wall of the first tube and located away from the first installation unit. A second tube is a hollow tube and extends through the first tube so as to define a first path between the first and second tubes. The second tube has a second path defined centrally therethrough. The first and second paths communicate with the recess. When shocks are applied to the shock-absorbing device, the first and second cylinders move relatively and the first piston moves to open or close the side hole to control the hydraulic liquid flow between the first and second paths.

The primary object of the present invention is to provide a rear shock-absorbing device wherein the first and second tubes are located in the center of the first and second cylinders, and first and second paths are defined between the two tubes so as to increase the length of the path for the hydraulic liquid to increase the shock-absorbing feature and keep the pressure between the first and second cylinders stable.

A second object of the present invention is to provide a rear shock-absorbing device wherein the first and second tubes are cooperated with a plug to control the volume of the hydraulic liquid, such that the return speed of the shock-absorbing device is adjusted while the compression speed of the shock-absorbing device is maintained the same. By this way, the cyclists feel more comfortable.

A third object of the present invention is to provide a rear shock-absorbing device wherein the first and second paths in the first and second tubes provide part of the hydraulic liquid to flow therein so as to obtain the shock-absorbing device of simplified structure and light in weight.

A fourth object of the present invention is to provide a rear shock-absorbing device wherein the first and second tubes are securely installed to the center of the first and second cylinders so as to avoid leakage.

A fifth object of the present invention is to provide a rear shock-absorbing device wherein adjustment device and the third cylinder to allow the first and second paths of the first and second tubes to be cooperated with plugs to be able to absorb different levels of shocks.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
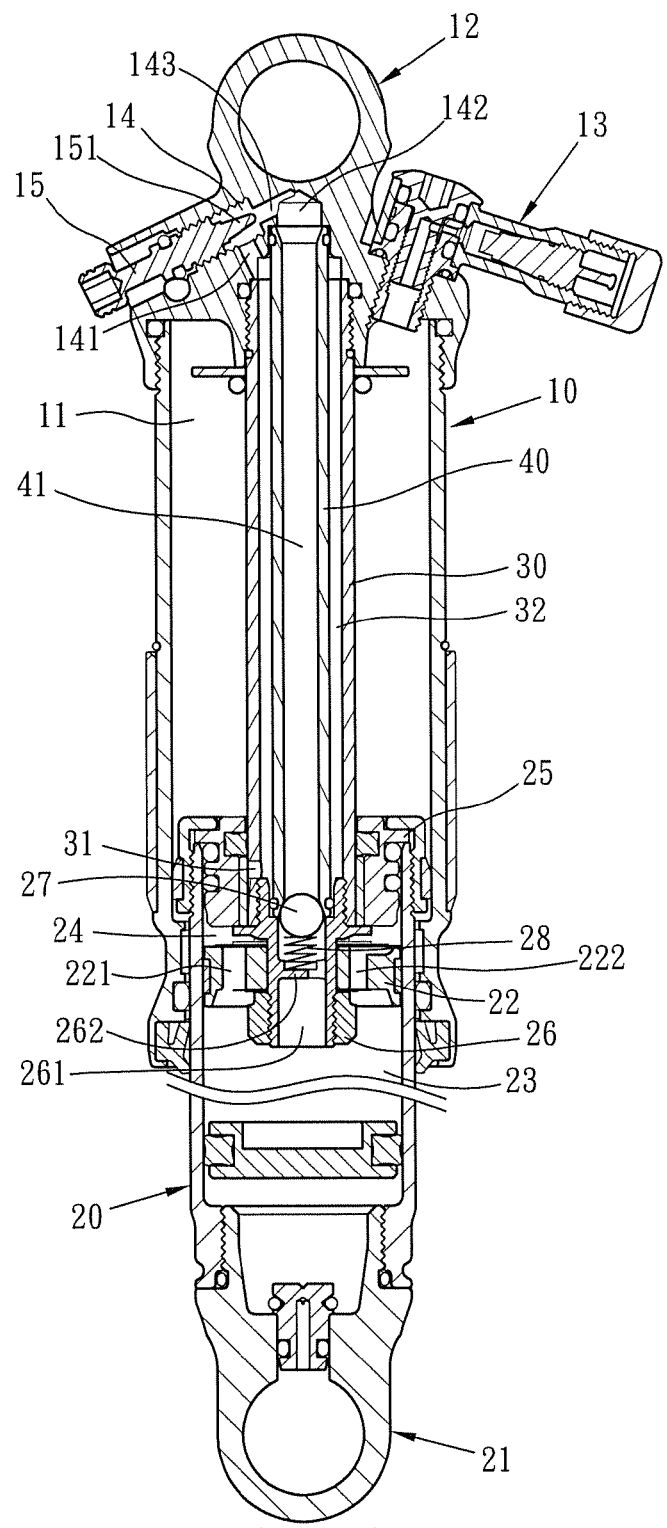
FIG. 1 is a cross sectional view of the shock-absorbing device of the present invention.
Figure 2:
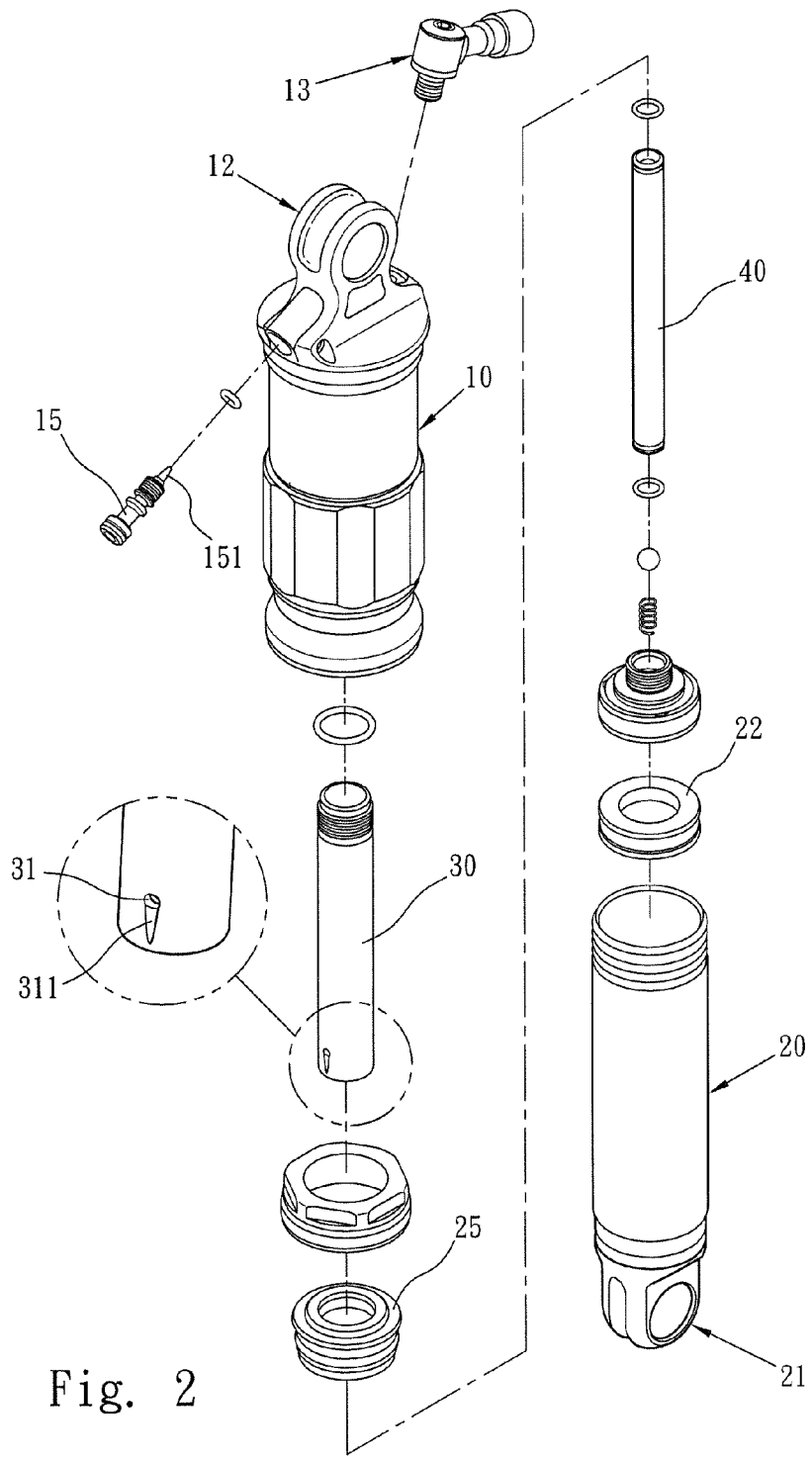
FIG. 2 is an exploded view to show the shock-absorbing device of the present invention.

Referring to FIGS. 1 and 2, the rear shock-absorbing device of the present invention comprises a first cylinder 10 and a second cylinder 20 which is movably inserted into the first cylinder 10. A first tube 30 and a second tube 40 are located in the first and second cylinders 10, 20.

The first cylinder 10 has a first room 11 defined therein and a first installation unit 12 is connected to an end of the first cylinder 10, the first installation unit 12 is connected to a bicycle frame. The first installation unit 12 has an air valve 13 connected thereto so as to provide pressure and adjust pressure in the first room 11. A recess 14 is defined in the first installation unit 12 and has a first through hole 141 defined radially therein. The first installation unit 12 has a second through hole 142 defined in a center thereof. A passage 143 is defined between the recess 14 and the second through hole 142. The second path 41 communicates with the second through hole 142. A plug 151 is movably received in the recess 14 and includes a cone-shaped section 151 to control the size of the passage 143 to control the volume passing through the passage 143.

The second cylinder 20 extends into the first room 11 so as to be linearly moveable in the first cylinder 10. A second installation unit 21 is connected to an end of the second cylinder 20 and the second installation unit 21 is connected to the bicycle frame. A first piston 22 is located in the second cylinder 20 so as to form multiple holes such as the first hole 221 and a second hole 222. The first piston 22 defines a second room 23 and a third room 24. The second room 23 is located close to the second installation unit 21 and the third room 24 is located away from the second installation unit 21. Hydraulic liquid is filled in the second and third rooms 23, 24. The first hole 221 is a one-way valve allowing the hydraulic liquid to flow from the second room 23 to the third room 24. The second hole 222 is a one-way valve allowing the hydraulic liquid to flow from the third room 24 into the second room 23. A ring 25 is connected to an open end of the second cylinder 20 and located away from the second installation unit 21.

The first tube 30 is a hollow tube and extends through the center of the first room 11. The first tube 30 has a first end connected with the first installation unit 12 and a second end of the first tube 30 extends through the second cylinder 20 and the ring 25 and is connected to a connection member 26 and the first piston 22. A side hole 31 is defined through the wall of the first tube 30 and located away from the first installation unit 12 and close to the first hole 221. The first tube 30 has an inclined notch 311 defined in an end located away from the first installation unit 12 and close to the connection member 26. The connection member 26 has a end hole 261 defined centrally therein which includes a positioning portion 262 extending therefrom. The notch 311 communicates with the side hole 31.

The second tube 40 is a hollow tube and its diameter is smaller than that of the first tube 30. The length of the second tube 40 is longer than that of the first tube 30. The second tube 40 extends through the first tube 30 and is connected to the connection member 26 so as to define a first path 32 between the first and second tubes 30, 40. The first path 32 communicates with the first through hole 141. The second tube 40 has a second path 41 defined centrally therethrough. The second path 41 communicates with the second through hole 142. The first and second paths 32, 42 communicate with the recess 14. The ring 25 seals the side hole 31 and the notch 311. A sealing member 27 and a resilient member 28 are located between the second path 41 and the positioning portion 262. The sealing member 27 is located in the open end of the second path 41 and located away from the first installation end 12, and the resilient member 28 has one end contacting the positioning portion 262 and the other end of the resilient member 28 biases the sealing member 27 so as to block the second path 41, wherein the sealing member 27 can be a ball.

When shocks are applied to the shock-absorbing device, the first and second cylinders 10, 20 move relatively and the first piston 22 moves linearly to open or close the side hole 31 to control the hydraulic liquid to flow between the first and second paths 32, 41.

Figure 3:
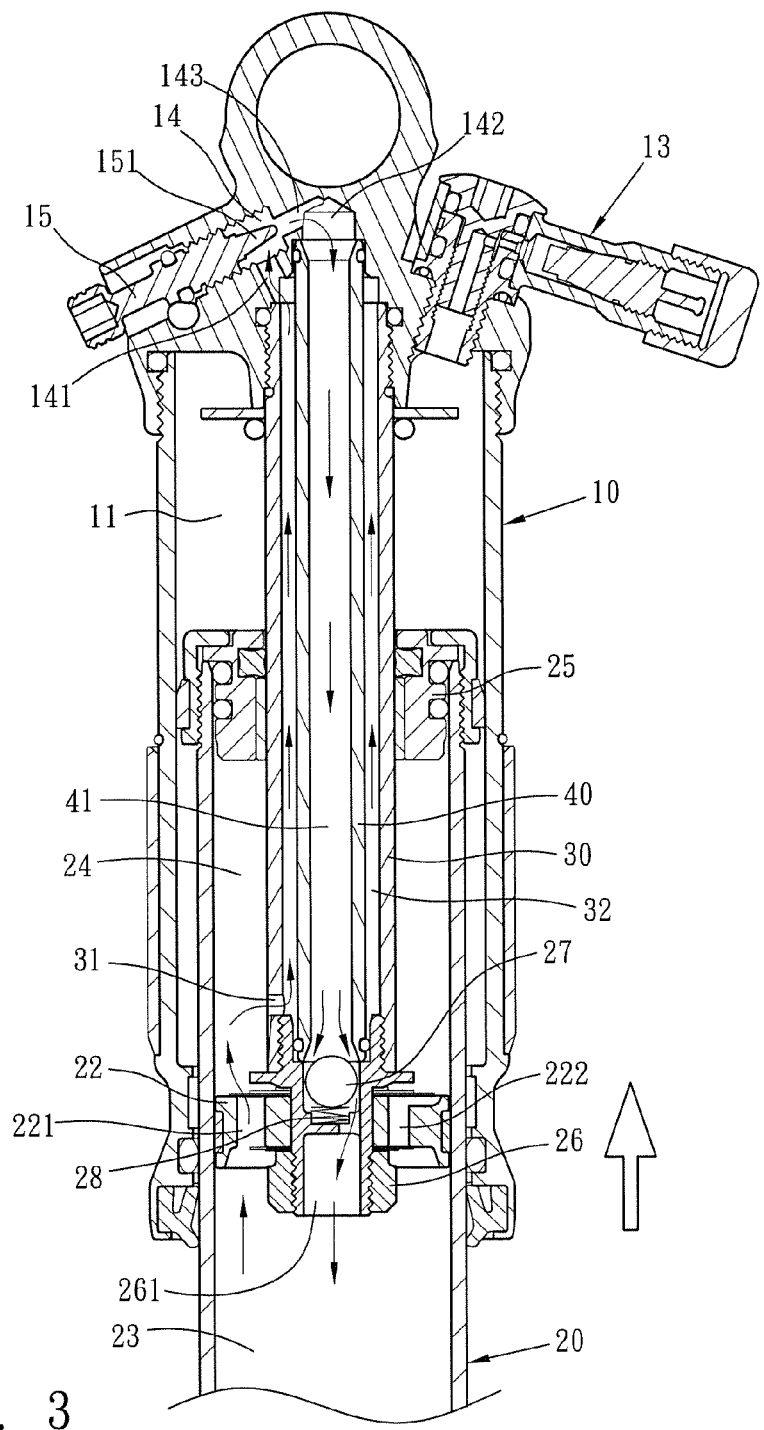
FIG. 3 shows that the shock-absorbing device of the present invention is compressed.

As shown in FIG. 3, when the bicycle is on a rough road and shocks apply to the bicycle, the first and second cylinders 10, 20 are relatively moved and the air in the first room 11 is compressed. The first and second tubes 30, 40, and the first piston 22 move in the second cylinder 20. A portion of the hydraulic liquid in the second room 23 flows into the third room 24 via the first hole 221 so as to absorb the shocks. The resilient member 28 pushes the sealing member 27 which blocks the second path 41 so that the hydraulic liquid in the second room 23 cannot enter the second path 41 via the end hole 261. In the meanwhile, the ring 25 does not seal the side hole 31 so that the hydraulic liquid in the third room 24 is partially flows into the first path 32 via the side hole 31 and the notch 311, and then flows into the recess 14, the second through hole 142 via the passage 143, and finally enters into the second path 41. When the hydraulic liquid in the second path 41 reaches a certain amount, the sealing member 27 is pushed to compress the resilient member 28 so that the hydraulic liquid in the second path 41 flows into the second room 23 via the end hole 261 to form a loop.

Figure 4:
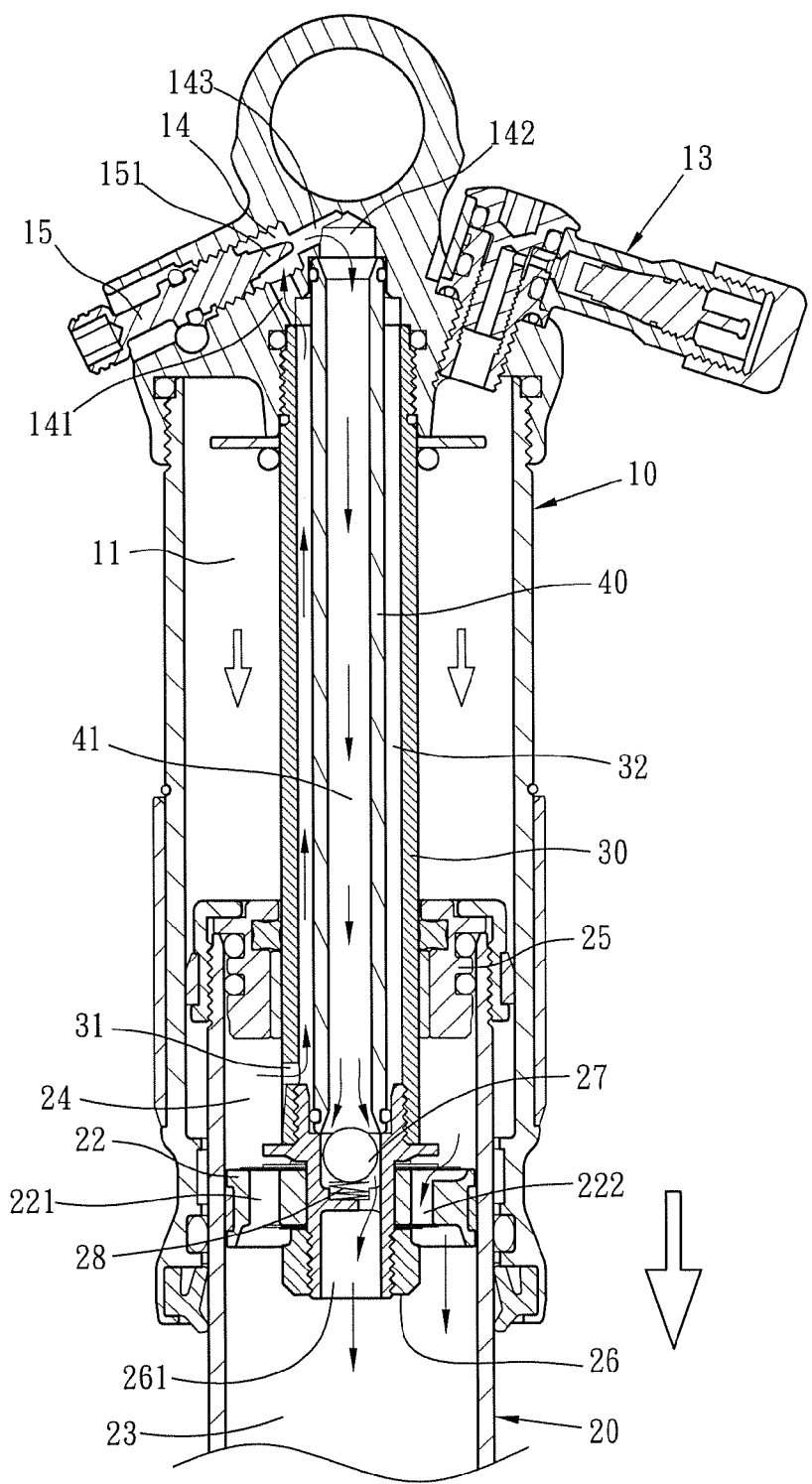
FIG. 4 shows that the shock-absorbing device of the present invention returns to its original position.

As shown in FIG. 4, when the shocks disappear, the pressurized air in the first room 11 provides a force to return the second cylinder 20 and the first tube 30, the second tube 40 and the first piston 22 move relatively. The hydraulic liquid in the third room 24 is compressed and flows back to the second room 23 via the second hole 222. The hydraulic liquid in the third room 24 partially enters into the first path 32 via the side hole 31, and flows through the first through hole 141, the recess 14, the passage 143 and the second through hole 142, and then flows into the second path 41 to move the sealing member 27 and compress the resilient member 28 to allow the hydraulic liquid in the second path 41 to flow into the second room 23 via the end hole 261.

Figure 5:
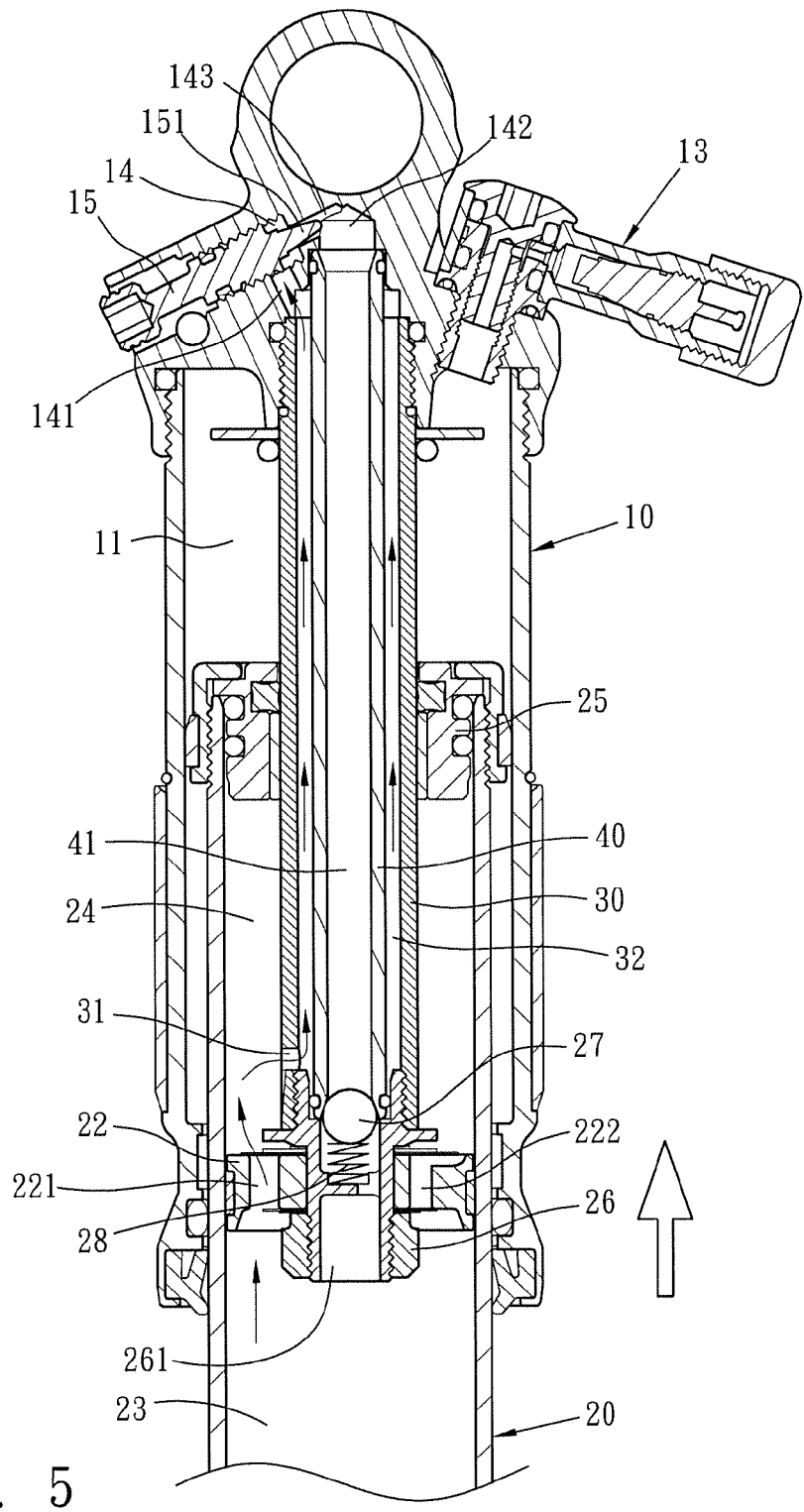
FIG. 5 shows that the second embodiment of the shock-absorbing device of the present invention is compressed.
Figure 6:
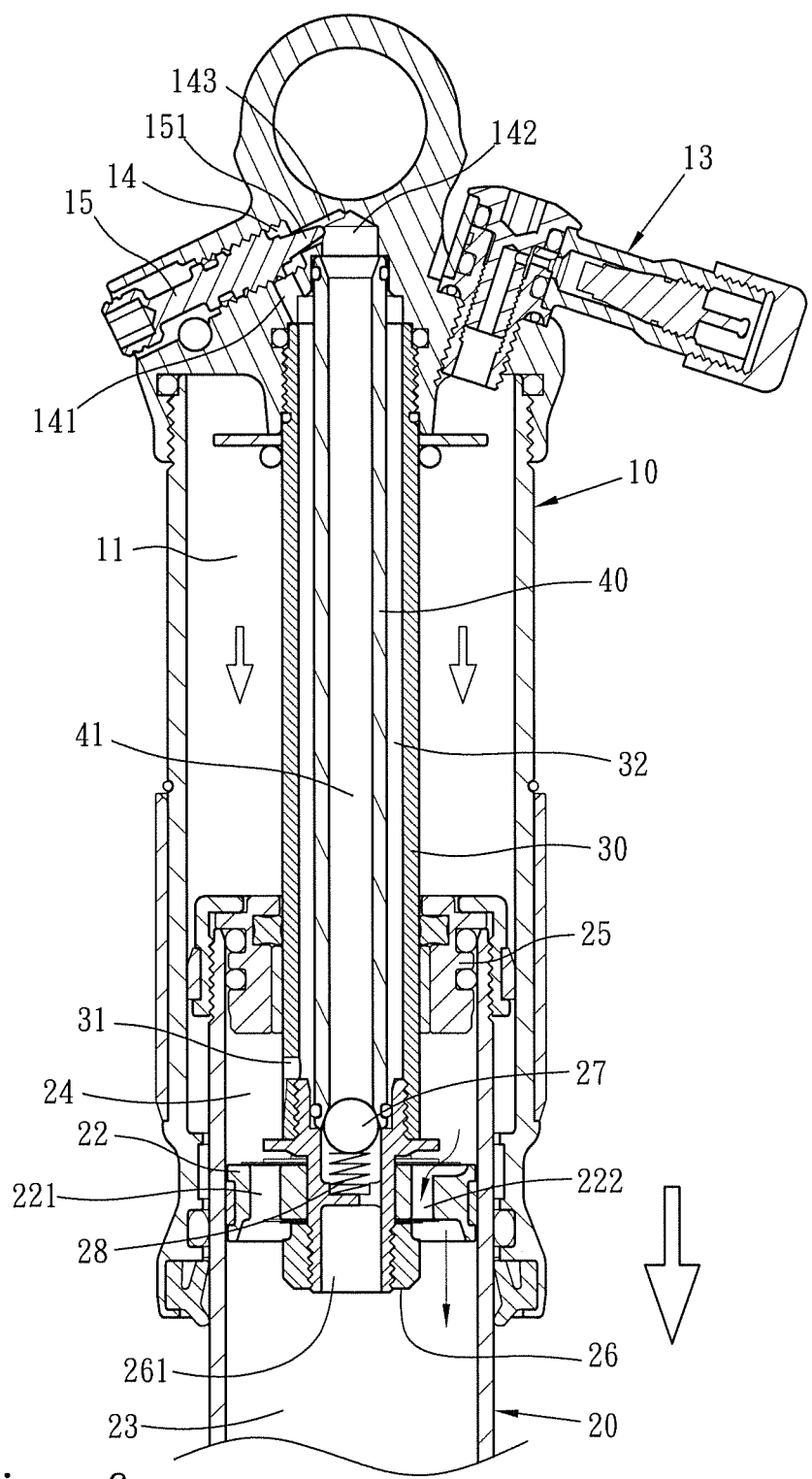
FIG. 6 shows that the second embodiment of the shock-absorbing device of the present invention returns to its original position.

As shown in FIGS. 5 and 6, which show the second embodiment of the present invention, wherein the plug 15 is adjusted to let the cone-shaped section 151 block the passage 143 to control the volume passing through the passage 143. When shocks are applied to the shock-absorbing device, the first and second cylinders 10, 20 move relatively, and the first piston 22 and the first and second tubes 30, 40 move to the second cylinder 20. The hydraulic liquid in the second room 23 partially flows into the third room 24 via the first hole 221 to absorb the shocks. Because the cone-shaped section 151 blocks the passage 143, the hydraulic liquid cannot enter the second path 41 via the passage 143, so that the speed of the compression of the rear shock-absorbing device does not change. When the shocks disappear, the pressurized air in the first room 11 pushes the second cylinder 20 downward and the hydraulic liquid in the second path 41 is not sufficient to push the sealing member 27. In the meanwhile, the hydraulic liquid in the third room 24 is compressed and flows back to the second room 23 via the second hole 222. Accordingly, when the rear shock-absorbing device is in operation, the compression speed is remained unchanged, the return speed can be reduced by the movement of the plug 15.

Figure 7:
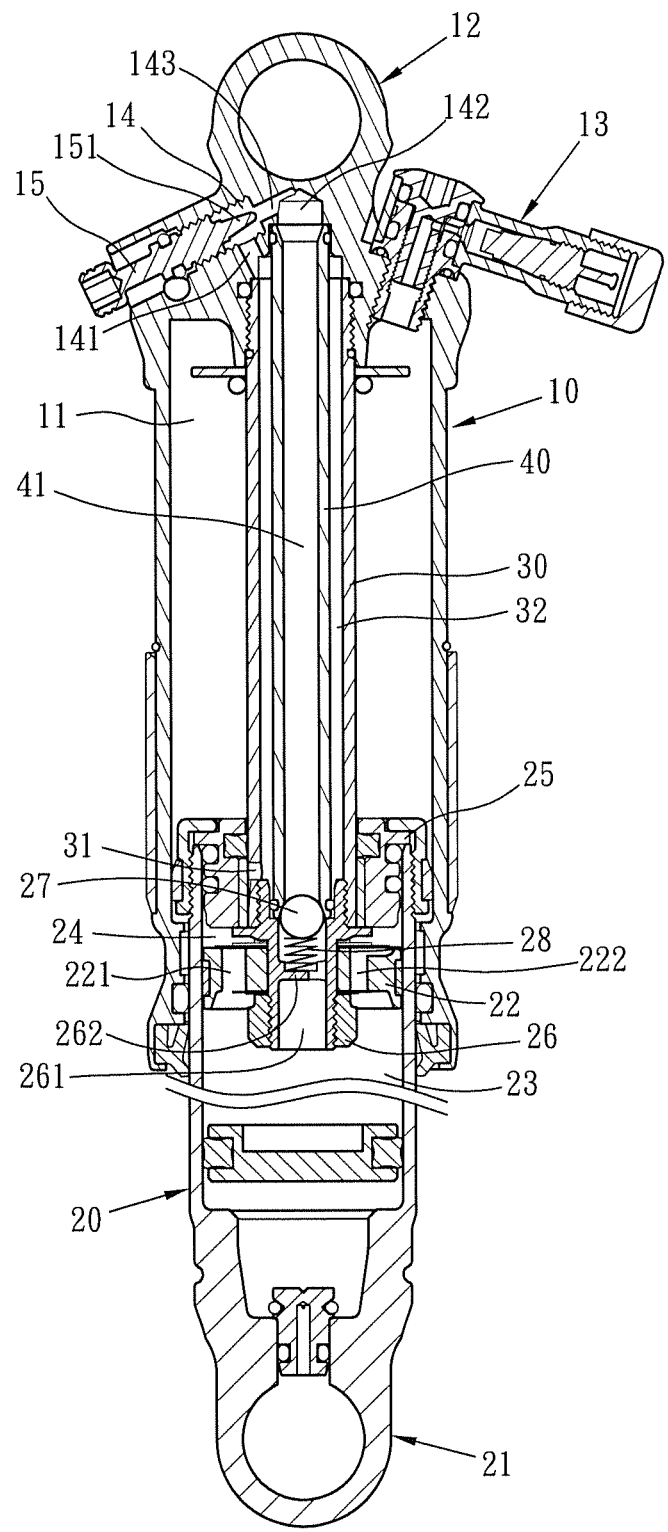
FIG. 7 shows the cross sectional view of the third embodiment of the shock-absorbing device of the present invention.
Figure 8:
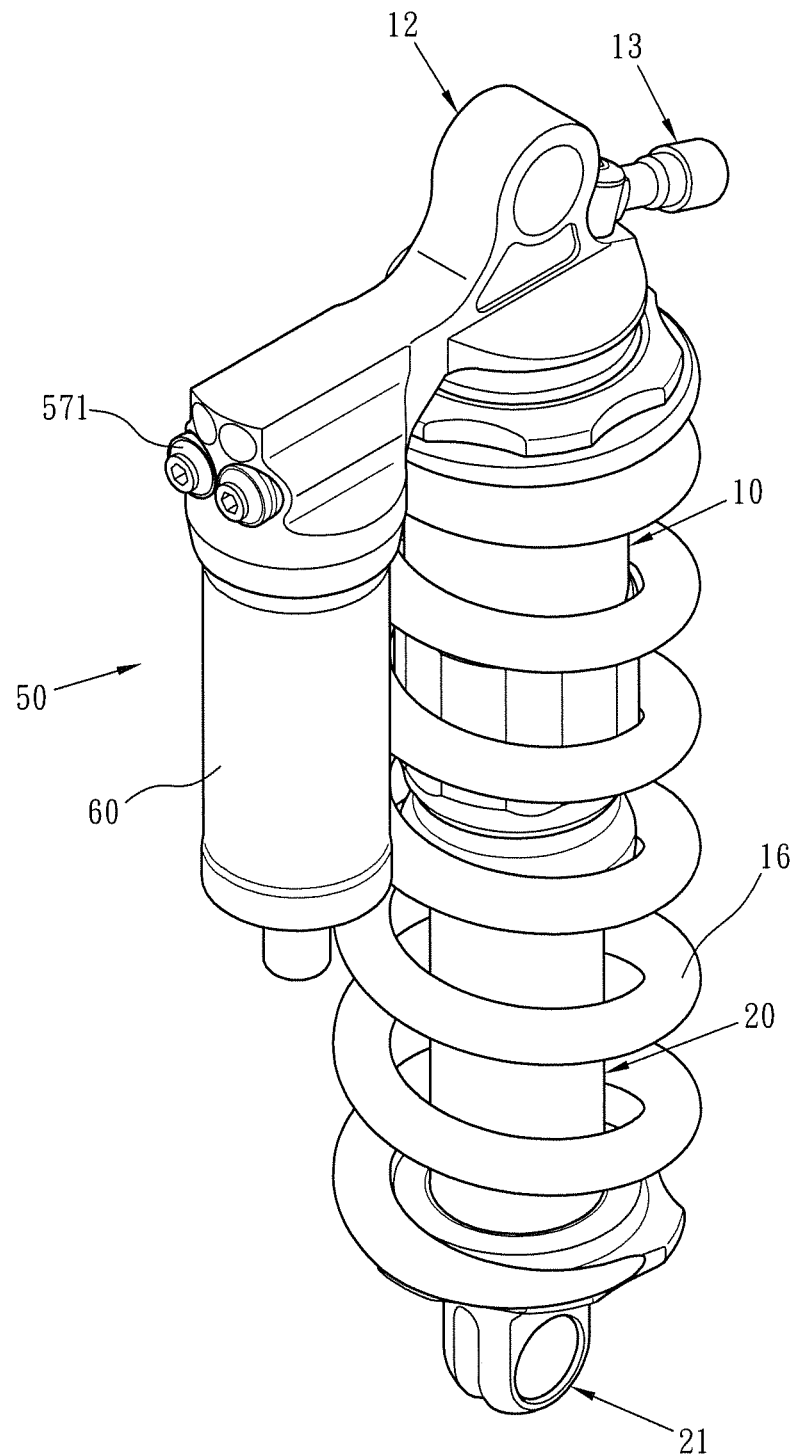
FIG. 8 is a perspective view to show the fourth embodiment of the shock-absorbing device of the present invention.
Figure 9:
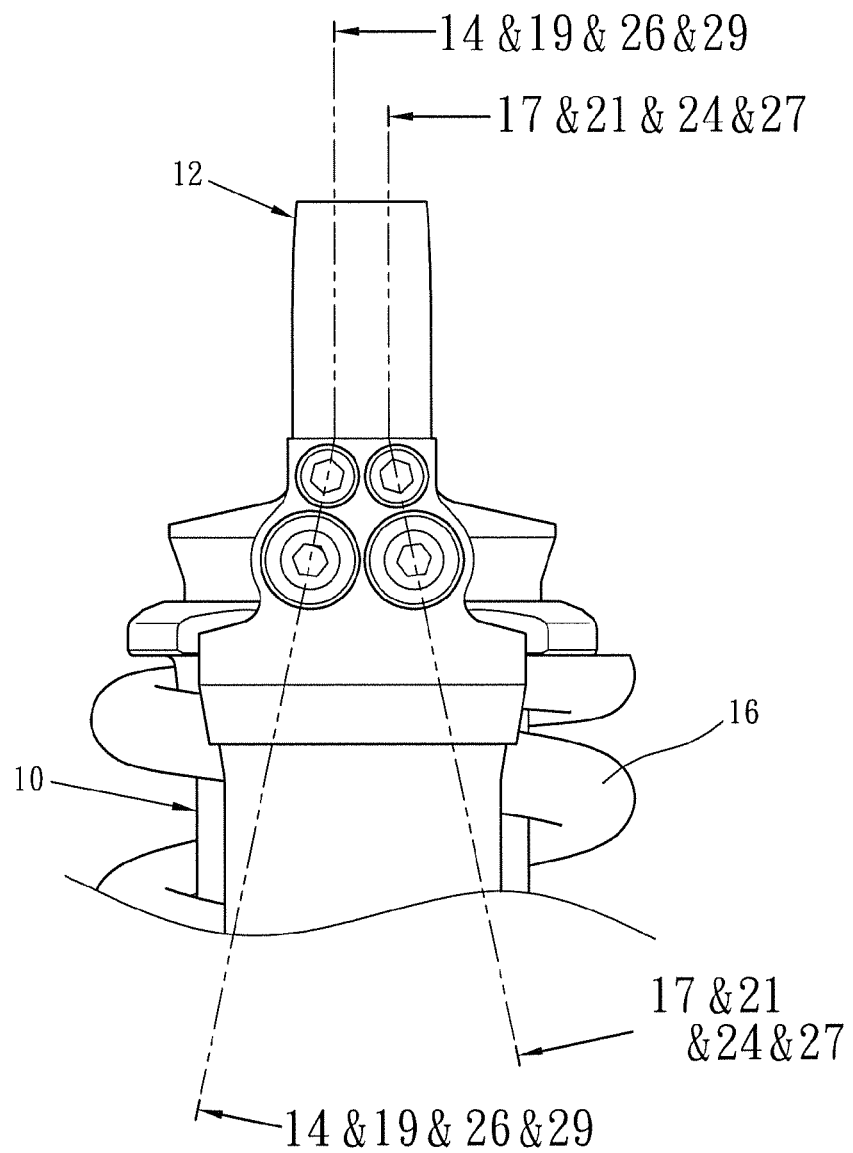
FIGS. 9 to 11 show the partial view of the fourth embodiment of the shock-absorbing device of the present invention.
Figure 10:
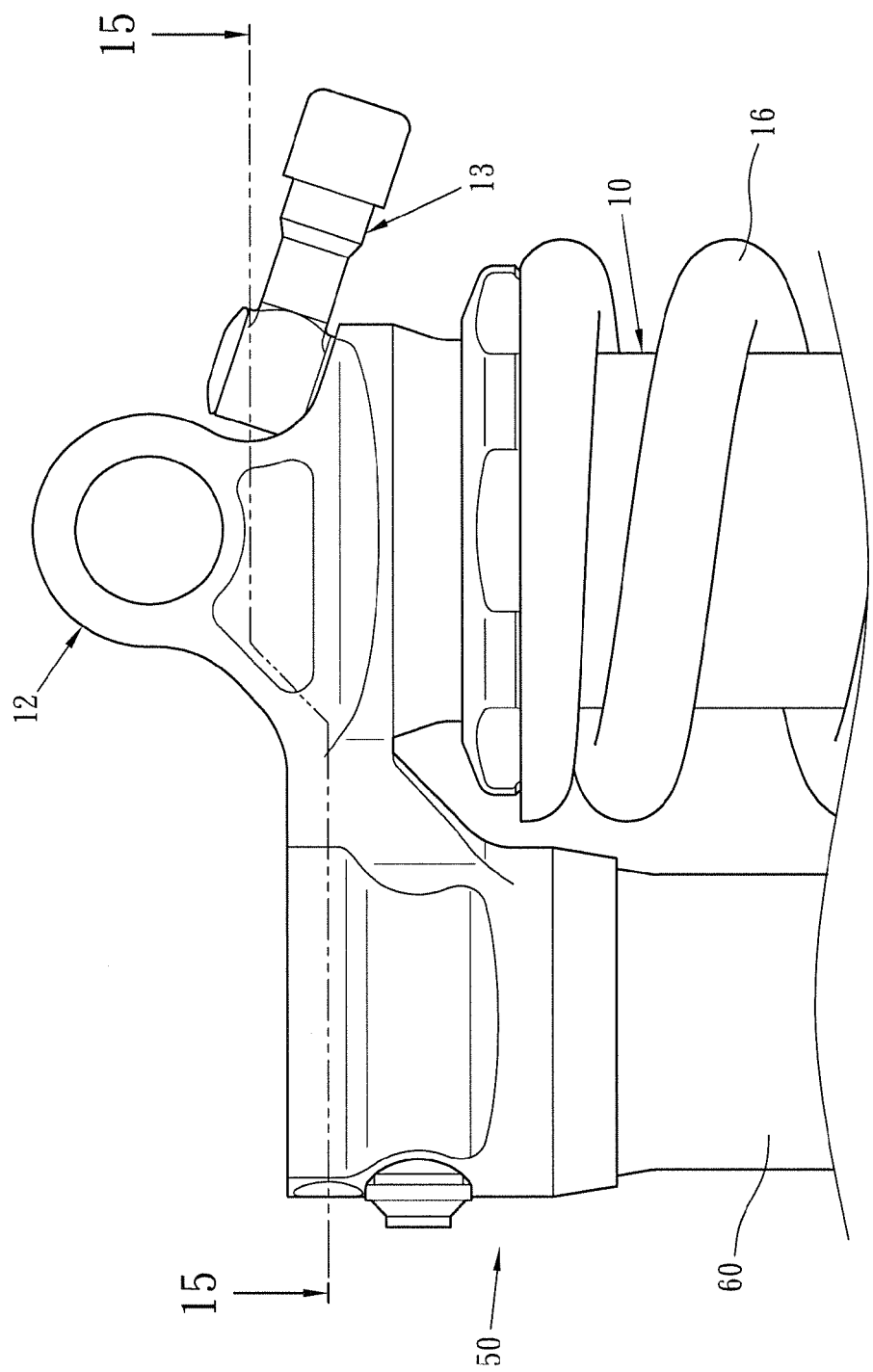
Figure 11:
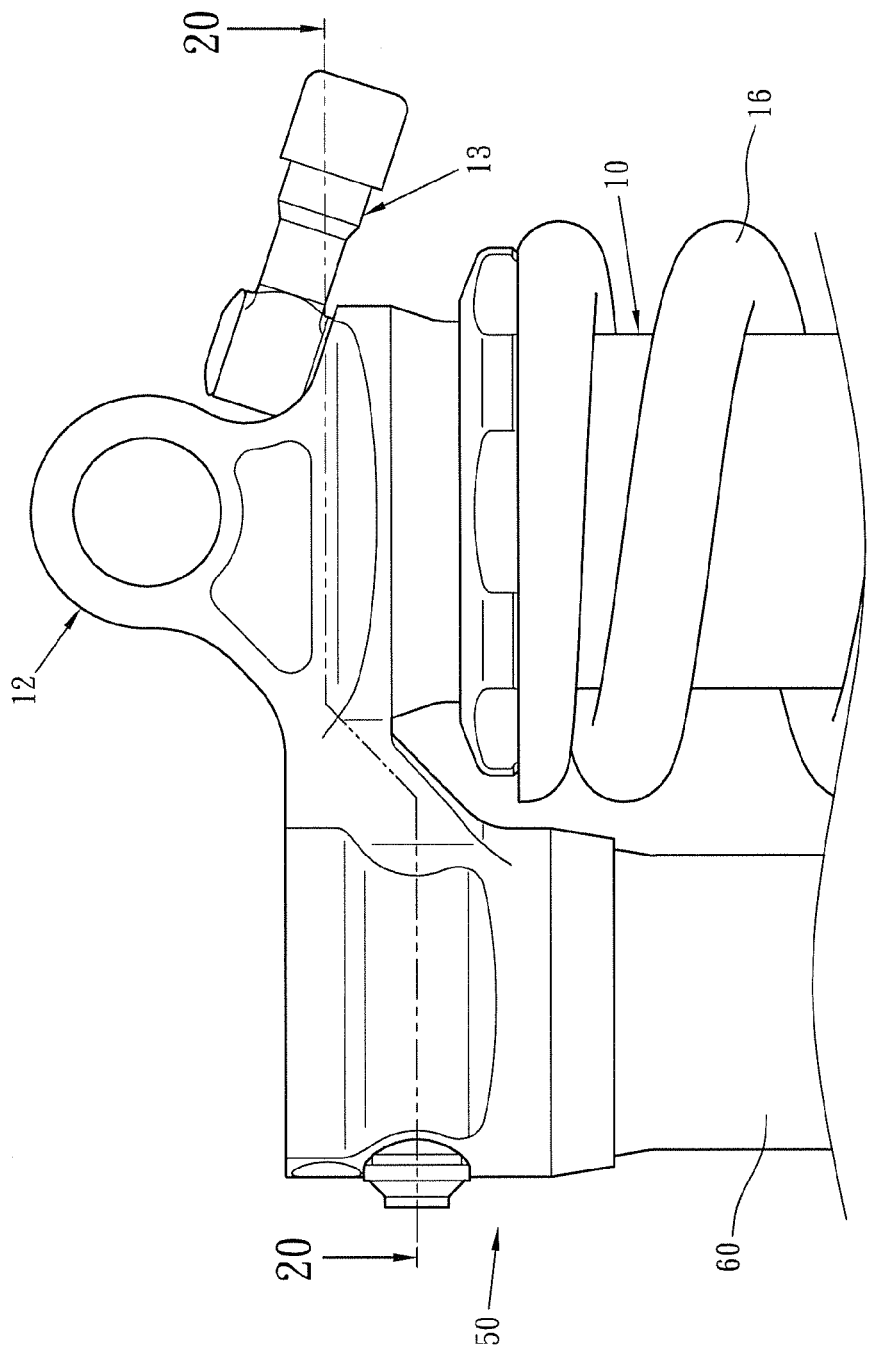
Figure 12:
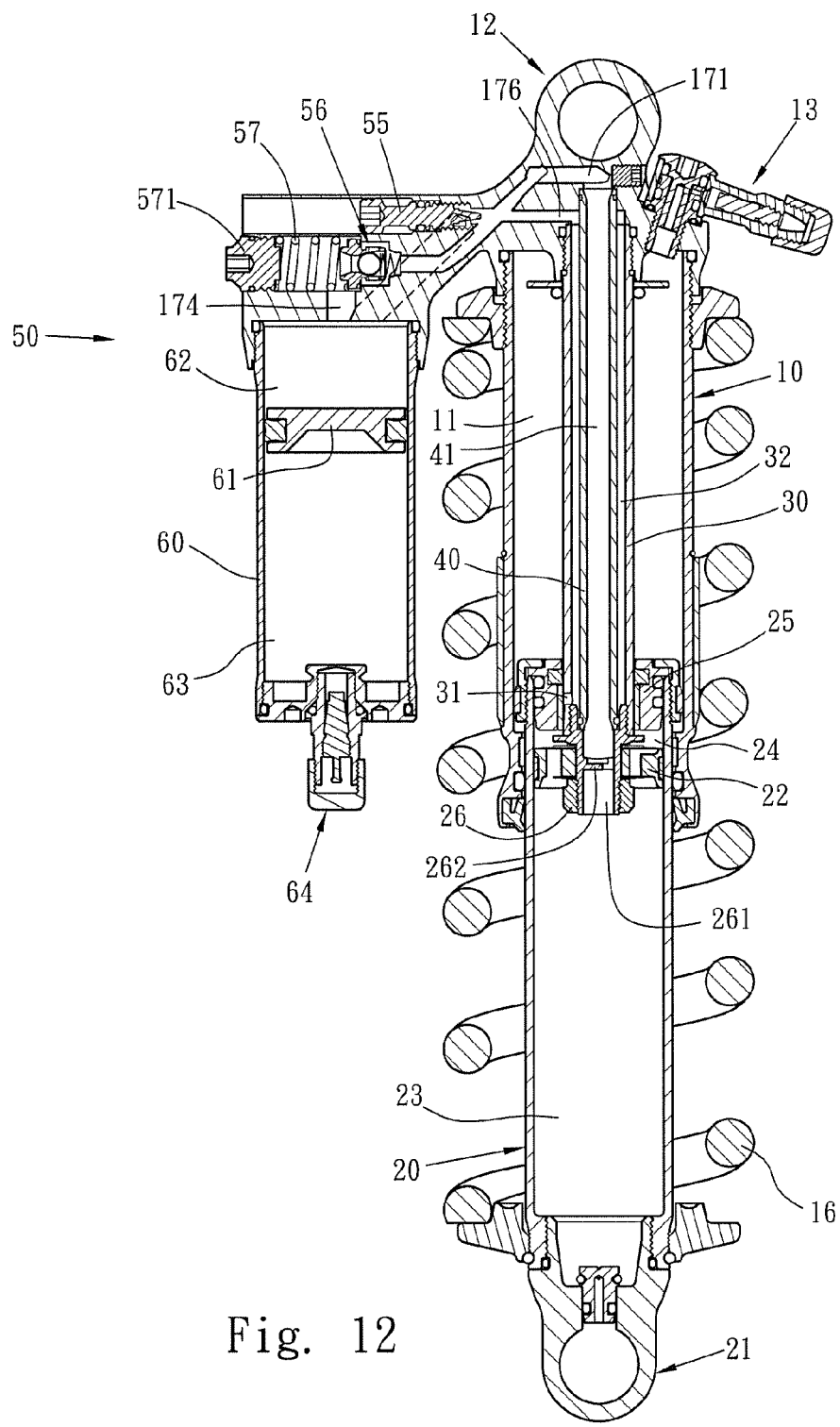
FIG. 12 is a cross sectional view of the fourth embodiment of the shock-absorbing device of the present invention.

It is noted that the first cylinder 10 and the first installation unit 12, and the second cylinder 20 and the second installation unit 21 can be individual parts which are connected to each other by known methods. FIG. 7 shows the third embodiment of the present invention wherein the first cylinder 10 and the first installation unit 12, and the second cylinder 20 and the second installation unit 21 are integrally formed with each other.

FIGS. 8 to 12 show the fourth embodiment wherein the sealing member 27 and the resilient member 28 located between the second path 41 and the connection member 26 are omitted, and a resilient member 16 is mounted to the first and second cylinders 10, 20. The first installation unit 12 has an adjustment device 50 on a side thereof. The resilient member 16 is a spring.

The adjustment device 50 has multiple recesses, multiple paths and a third cylinder 60. A first recess 51 and a second recess 52 are radially defined in an inside of the first installation unit 12, and a third recess 53 and a fourth recess 54 are radially defined in the inside of the first installation unit 12 and located opposite to the first and second recesses 51, 52. The first and third recesses 51, 53 have the same diameter, and the second and fourth recesses 51, 54 have the same diameter which is larger than the diameter of the first and third recesses 51, 53. The first, second, third and fourth recesses 51, 52, 53, 54 are located close to one side of the first cylinder 10 and respectively have a first, second, third, and fourth pass hole 511, 521, 531, 541. Each of the first and third recesses 51, 53 has a plug 55 received therein and each plug 55 has a cone-shaped section 551 which is located in the first/third pass hole 511/531 to control the volume passing through the first and third pass holes 511, 531 by moving the cone-shaped sections 551. Each of the second and fourth recesses 52, 54 has a seal valve 56 and a first resilient piece 57 received therein. Each of the seal valves 56 includes a body 561 and a one-way valve 562. Each one-way valve 562 is located at connection portion between the second recess 52, the fourth recess 54, the second pass hole 521 and the fourth pass hole 541. The first resilient piece 57 is located in an end of the body 561 of the seal valve 56 corresponding thereto and located away from the second and fourth pass holes 521, 541. A second resilient piece 58 is located between each seal valve 56 and the second and fourth pass holes 521, 541. Each of the seal valves 56 is biased by the second resilient piece 58 so as to form a gap 522/542 in the second/fourth recess 52/54. The spring force of the second resilient piece 58 is less than that of the first resilient piece 57. An adjusting member 571 is connected to the first resilient piece 57 and located away from the seal valve 56 so as to control compression of the first resilient piece 57 and volume passing through the seal valve 56.

The first installation unit 12 has a third path 171 defined radially therein which communicates between the second path 41 and a fourth path 172. The fourth path 172 communicates with the first and second pass holes 511, 521. A fifth path 173 is located between the first and third recesses 51, 53. The fifth path 173 is parallel to the fourth path 172. An end of the fifth path 173 communicates with the first and third pass holes 511, 531. A sixth path 174 is located between the second and fourth recesses 52, 54. An end of the sixth path 174 communicates with the second and fourth recesses 52, 54. A seventh path 175 is parallel to the fourth path 172, and the third and fourth pass holes 531, 541 communicate with the seventh path 175. An eighth path 176 is located radially in the first installation unit 12. An end of the eighth path 176 communicates between the first and seventh paths 32, 175.

The third cylinder 60 has a second piston 61 received therein so as to define a fourth room 62 and a fifth room 63. The fourth room 62 is located close to the first installation unit 12 and the fifth room 63 is located away from the fourth room 62. The third cylinder 60 has an air valve 64 connected thereto which provides and adjusts pressure in the fifth room 63. Each of the fifth and sixth paths 173, 174 has an end away from the first installation unit 12 and communicates with the fourth room 62.

Figure 13:
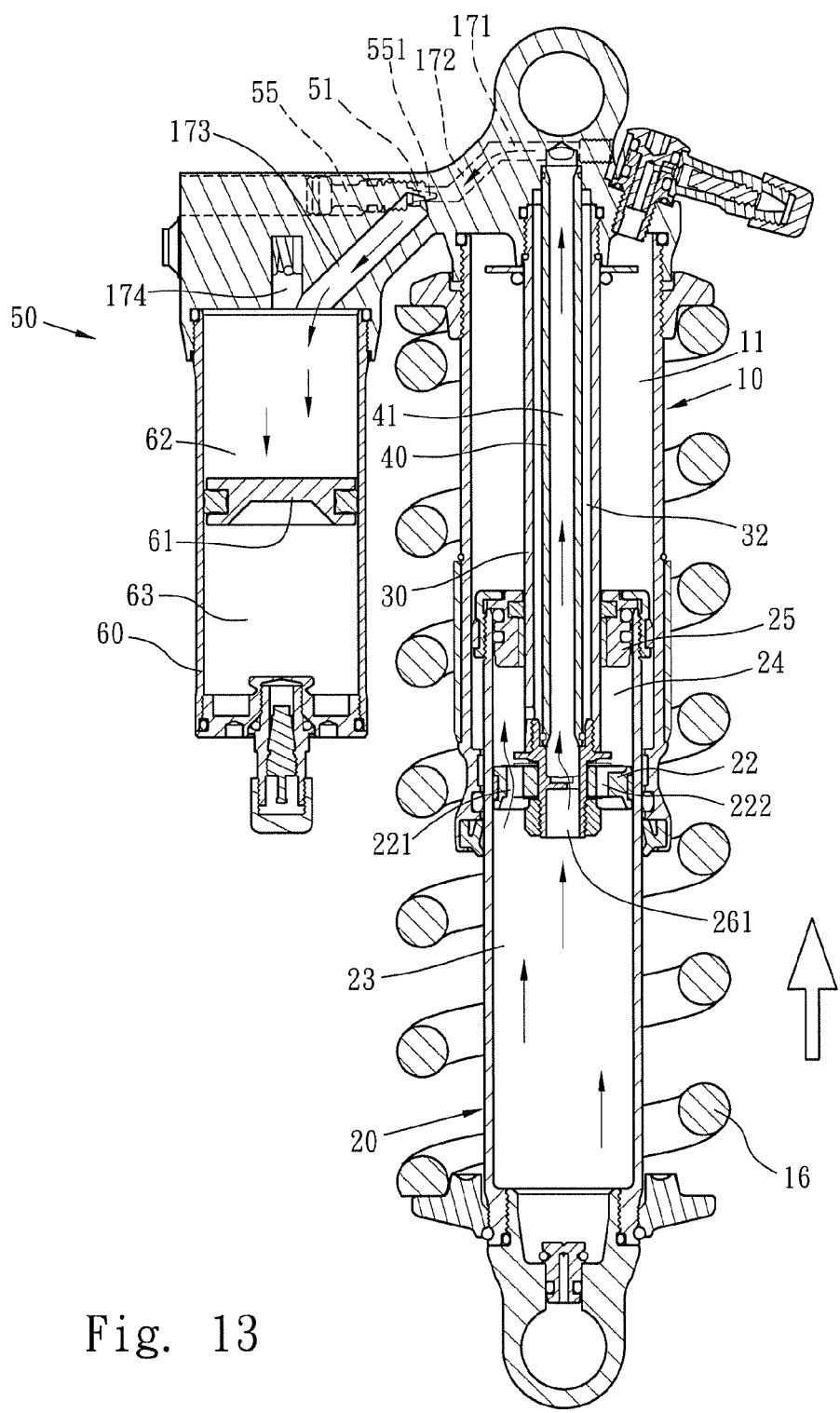
FIGS. 13 to 17 show the reaction of the fourth embodiment of the shock-absorbing device of the present invention when the shock-absorbing device is applied by minor shocks.
Figure 14:
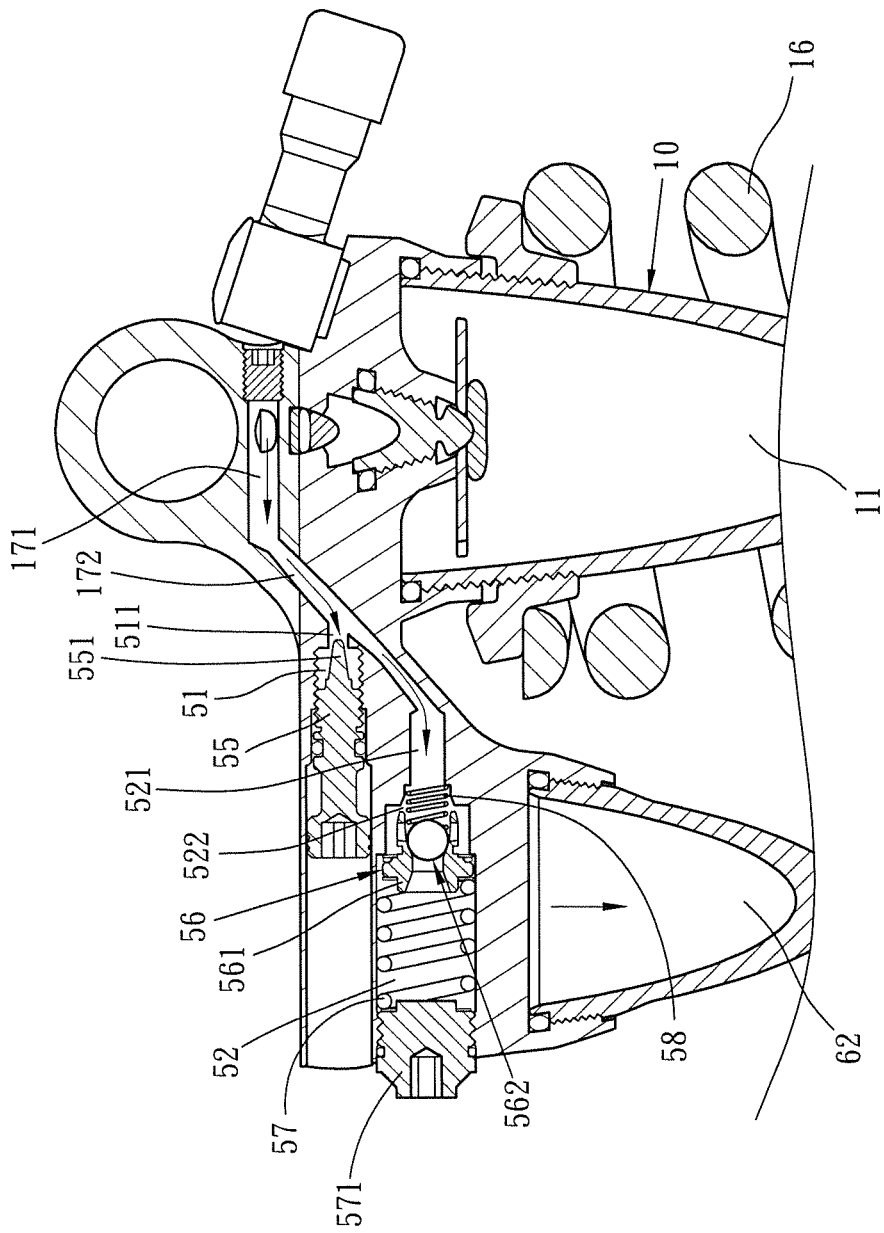
Figure 15:
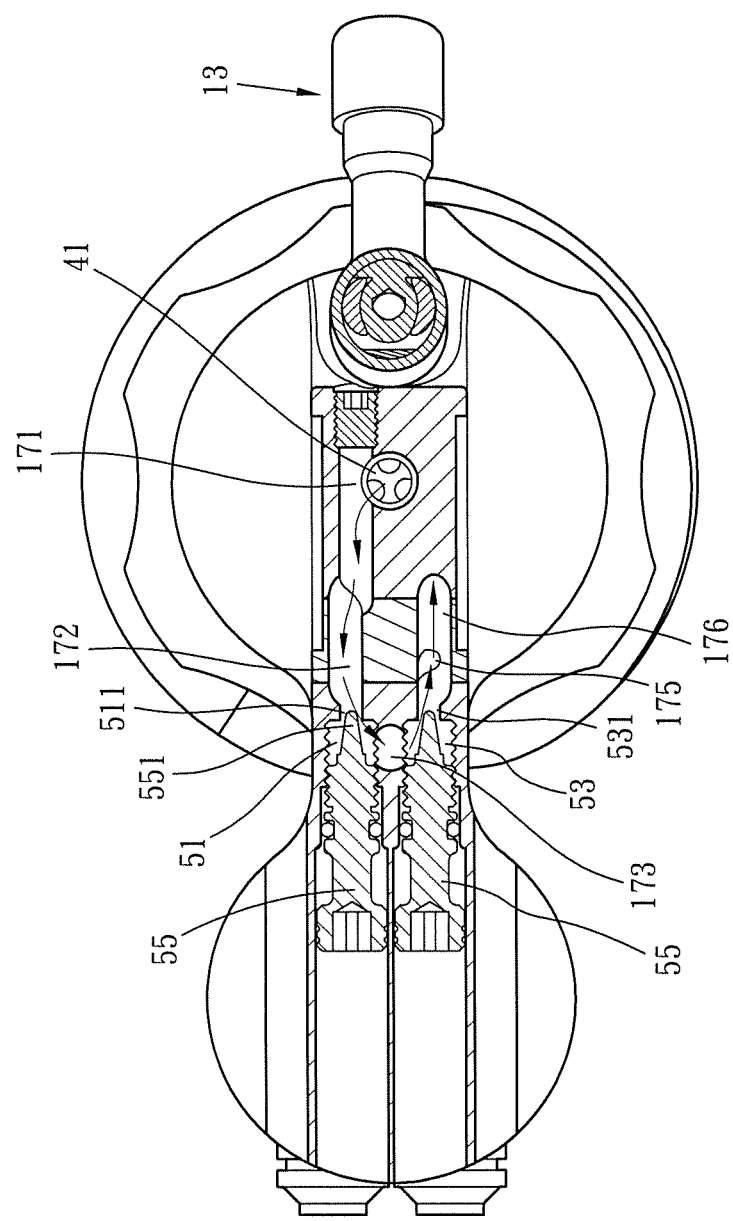
Figure 16:
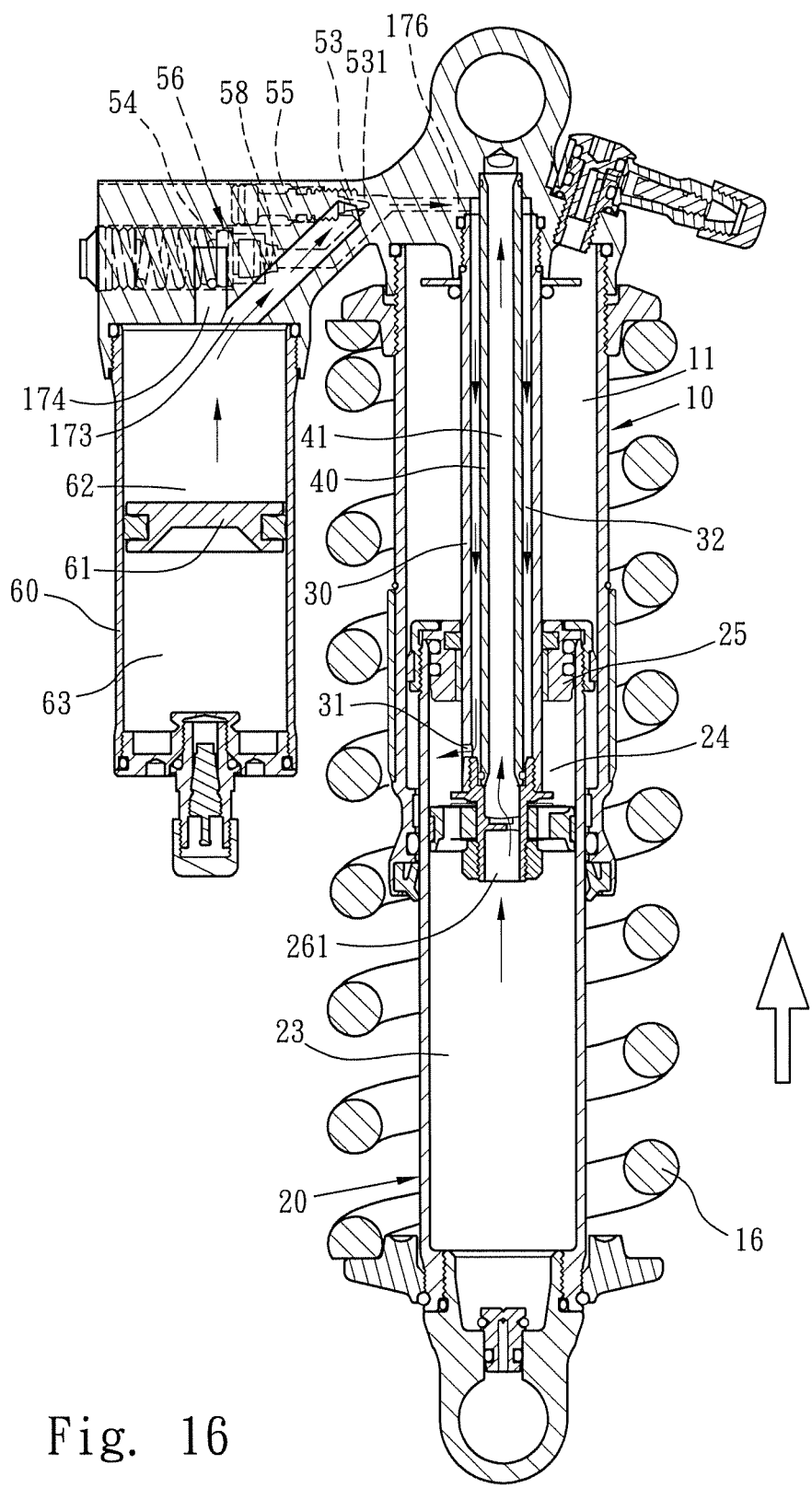
Figure 17:
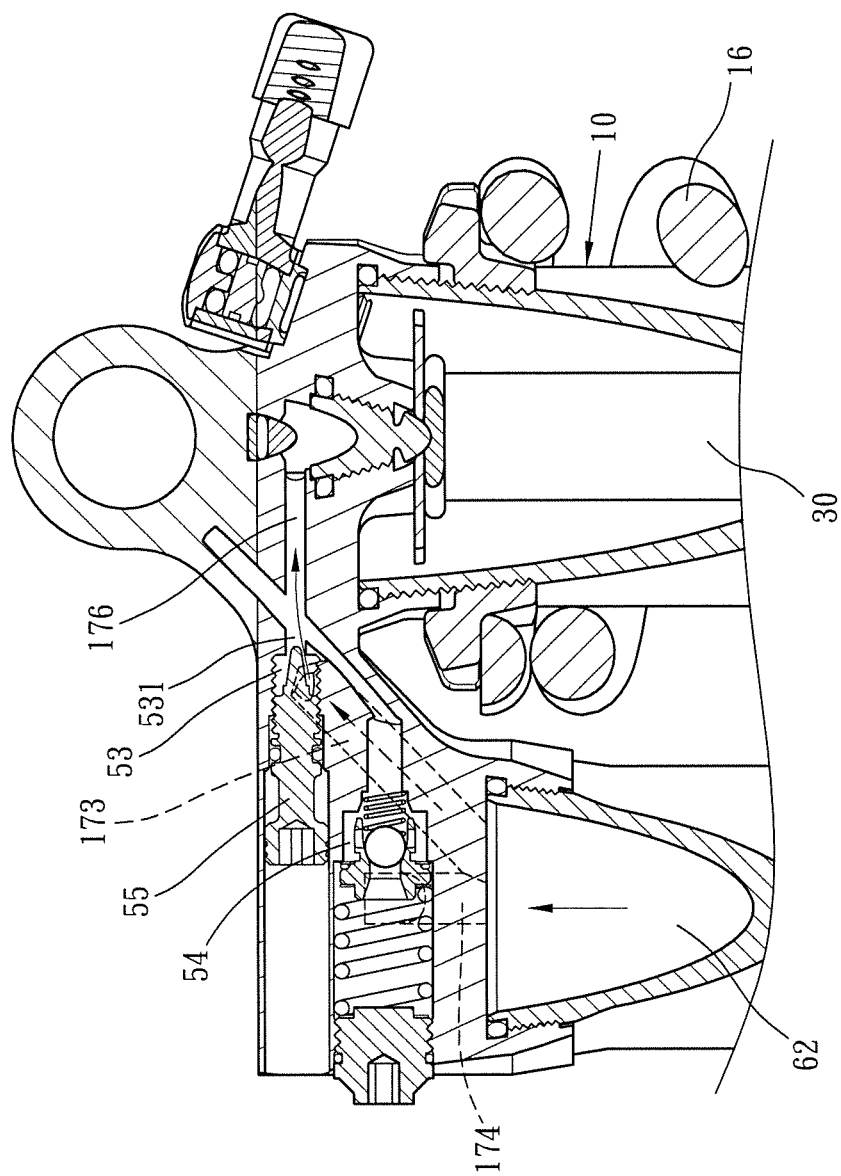
Figure 18:
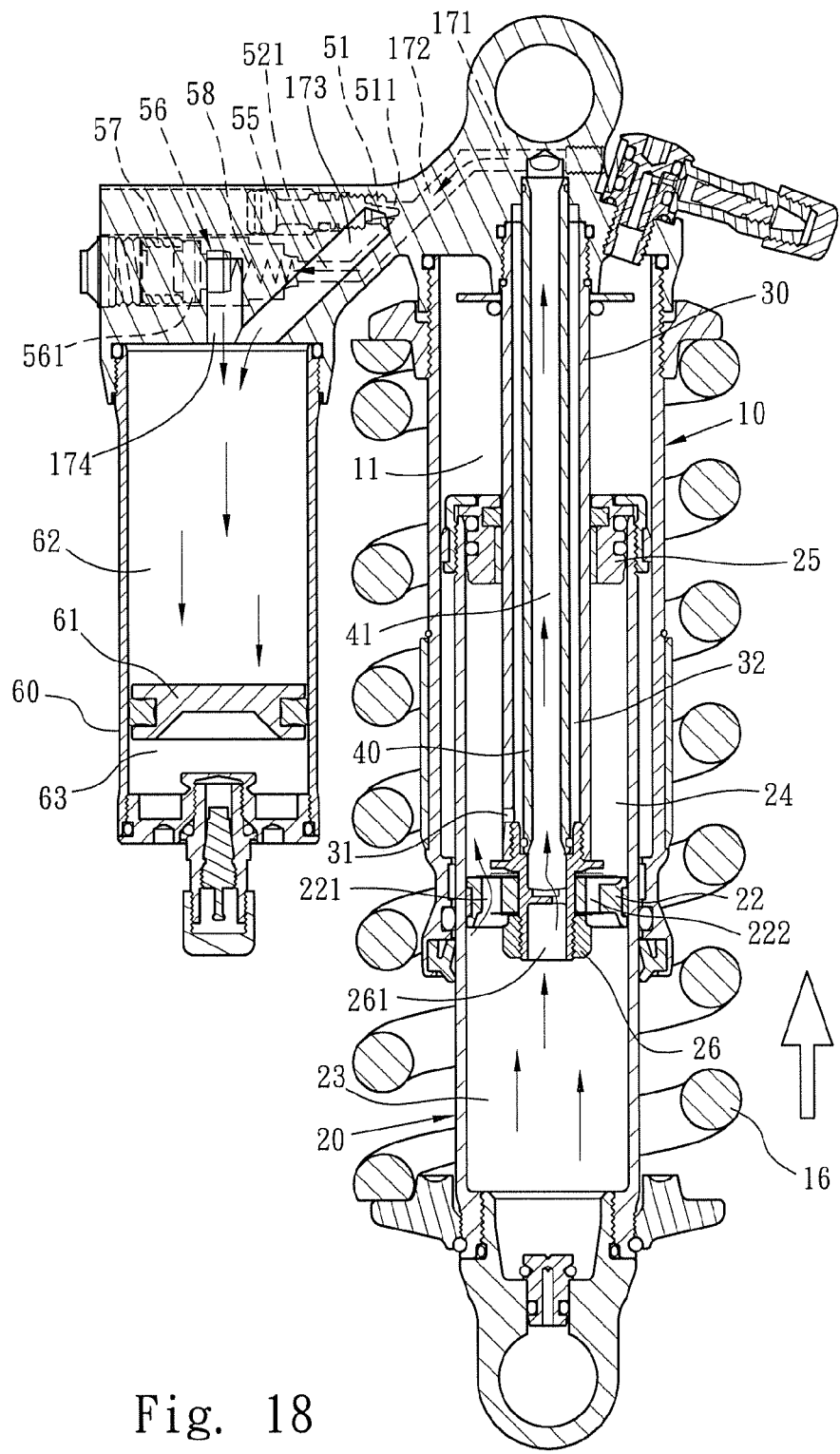
FIGS. 18 to 22 show the reaction of the fourth embodiment of the shock-absorbing device of the present invention when the shock-absorbing device is applied by minor shocks.
Figure 19:
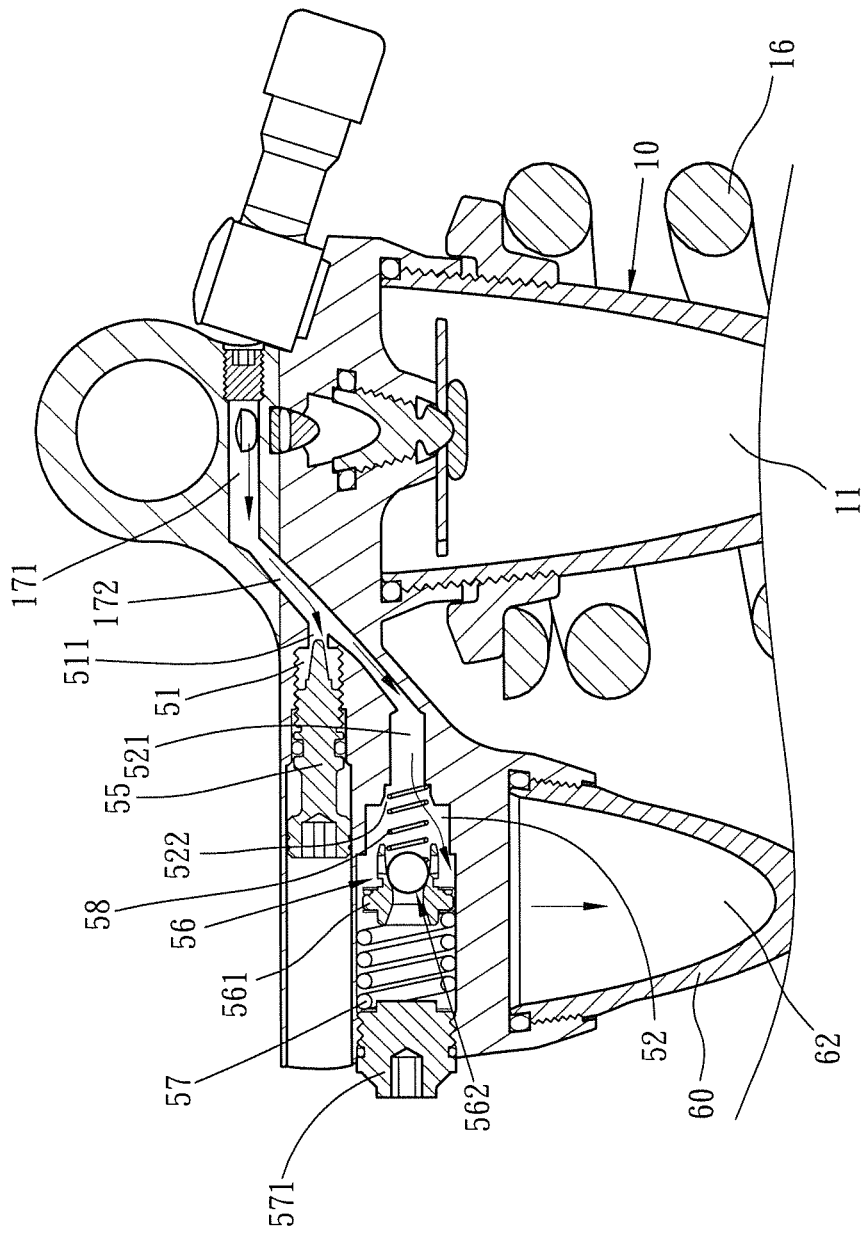
Figure 20:
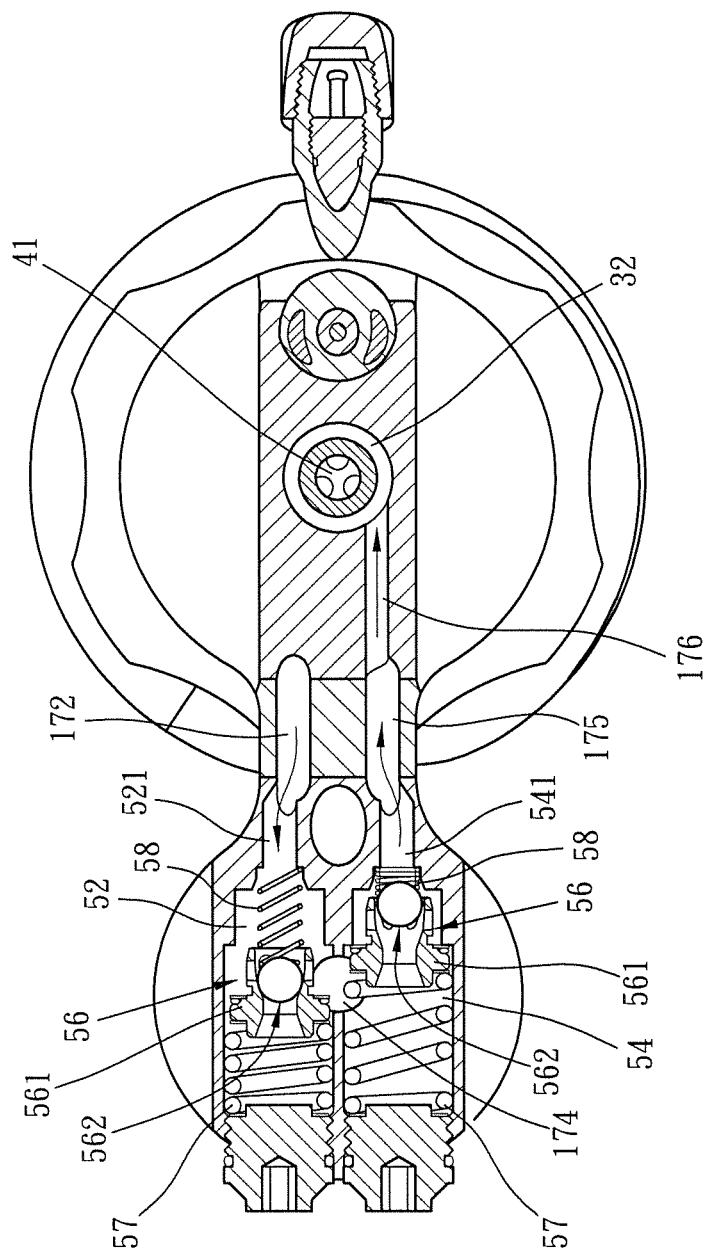
Figure 21:
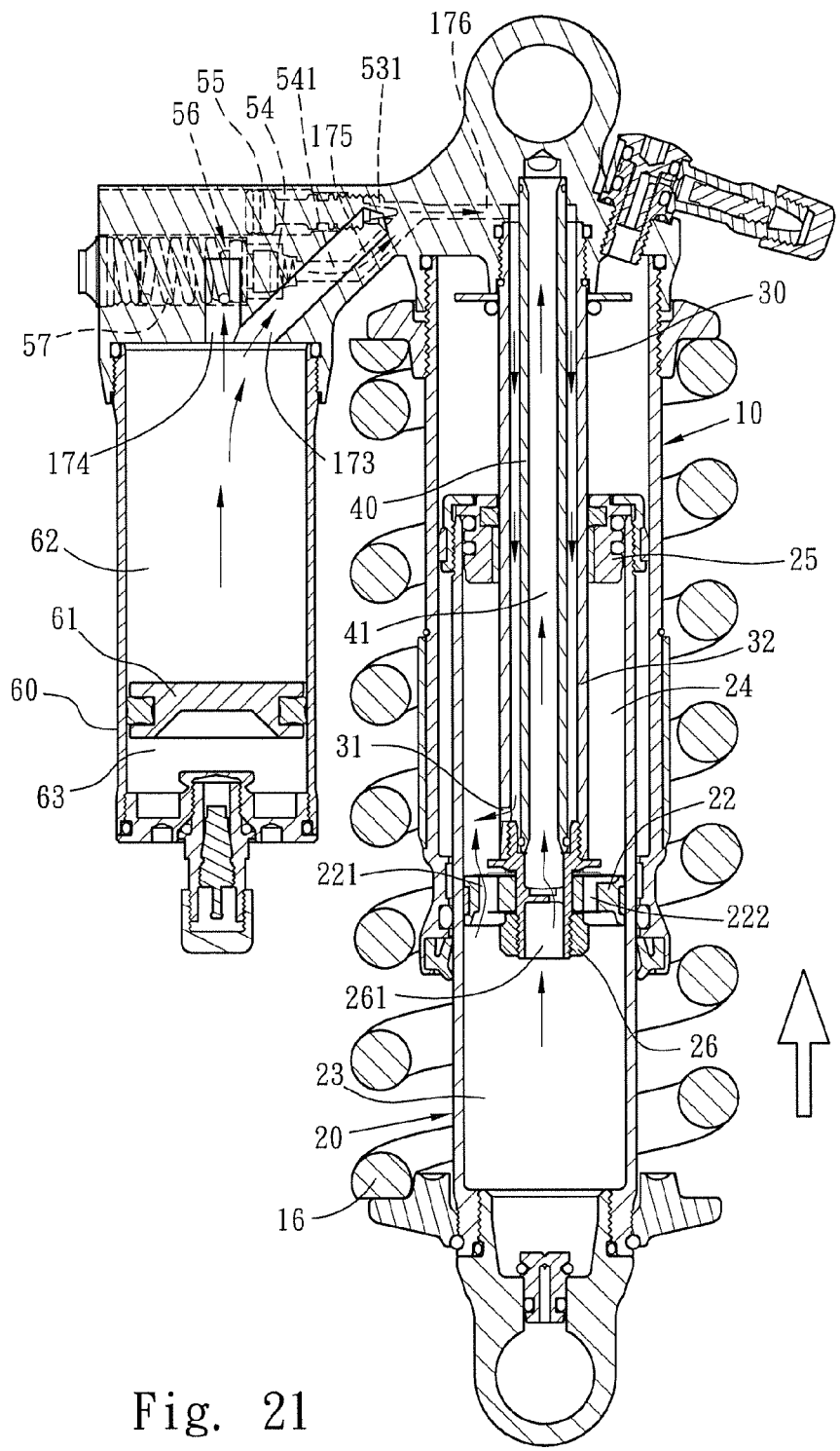
Figure 22:
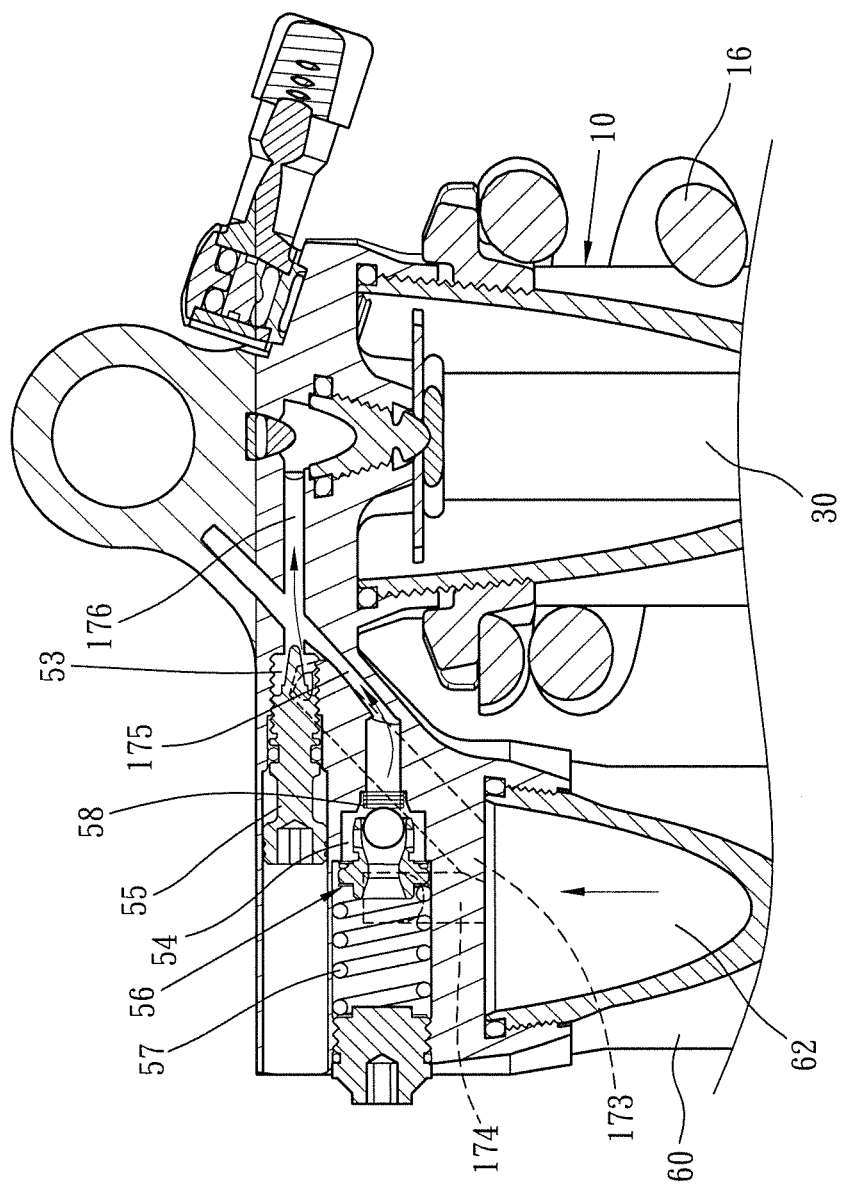

As shown in FIGS. 13 to 14, when shocks are applied to the shock-absorbing device, the first and second cylinders 10, 20 move relatively and the air in the first room 11 is compressed. The first and second cylinders 10, 20 and the first piston 22 move into the second cylinder 20 and ring 25 does not block the side hole 31, the hydraulic liquid in the second room 23 partially flows into the third room 24 via the first hole 221 so as to absorb the shocks. Due to the difference of pressure, the hydraulic liquid in the second room 23 partially flows into the second path 41 with lower pressure via the end hole 261, and then flows into the third and fourth paths 171, 172, and the first and second pass holes 511, 521.

When minor shocks are applied to the rear shock-absorbing device, the hydraulic liquid in the second pass hole 521 flows toward the opposite direction of the working direction of the one-way valve 562, so that the one-way valve 562 and the body 561 are not moved so that the hydraulic liquid cannot enter into the second recess 52. The hydraulic liquid in the first pass hole 511 flows into the first recess 51 and enters into the fourth room 62 via the fifth path 173 so as to move the second piston 61 to compress the air in the fifth room 63 to absorb the shocks.

When the air in the fifth room 63 is compressed, a force is generated and pushes the second piston 61 upward, so that the hydraulic liquid in the fourth room 62 flows into the fifth and sixth paths 173, 174 and respectively enters into the third and fourth recesses 53, 54. Due to the shocks are minor, the force cannot push the one-way valve 562 in the fourth recess 54, the hydraulic liquid enters into the seventh path 175 from the third recess 53 via the third pass hole 531, the hydraulic liquid then enters into the first path 32 and the third room 24 via the eighth path 176 and the side hole 31 to form a loop for bear the minor shocks.

When the rear shock-absorbing device is applied by significant shocks, as shown in FIGS. 18 to 22, the hydraulic liquid in the third and fourth paths 171, 172 enters the first and second pass holes 511, 521, and due to the shocks, significant amount of the hydraulic liquid enters into the gap 522 via the second pass hole 521 and moves the body 561 of the seal valve 56 and compresses the first resilient piece 57, such that the hydraulic liquid enters into the fourth room 62 via the sixth path 174. The second piston 61 is then pushed by the hydraulic liquid and the air in the fifth room 63 is compressed to absorb the shocks.

When the air in the fifth room 63 is compressed, a force is generated to move the second piston 61 upward to move the hydraulic liquid in the fourth room 62 into the fifth and sixth paths 173, 174, and enter into the third and fourth recesses 53, 54. Because the shocks are significant, the first resilient piece 57 moves the body 561 back to its original position and the hydraulic liquid drives the one-way valve 562 to compress the second resilient piece 58, so that significant amount of the hydraulic liquid enters into the seventh path 175 via the pass hole 541, and enters into the first path 32 via the eighth path 176, and finally enters into the third room 24 to form a loop for absorb the significant shocks.

Figure 23:
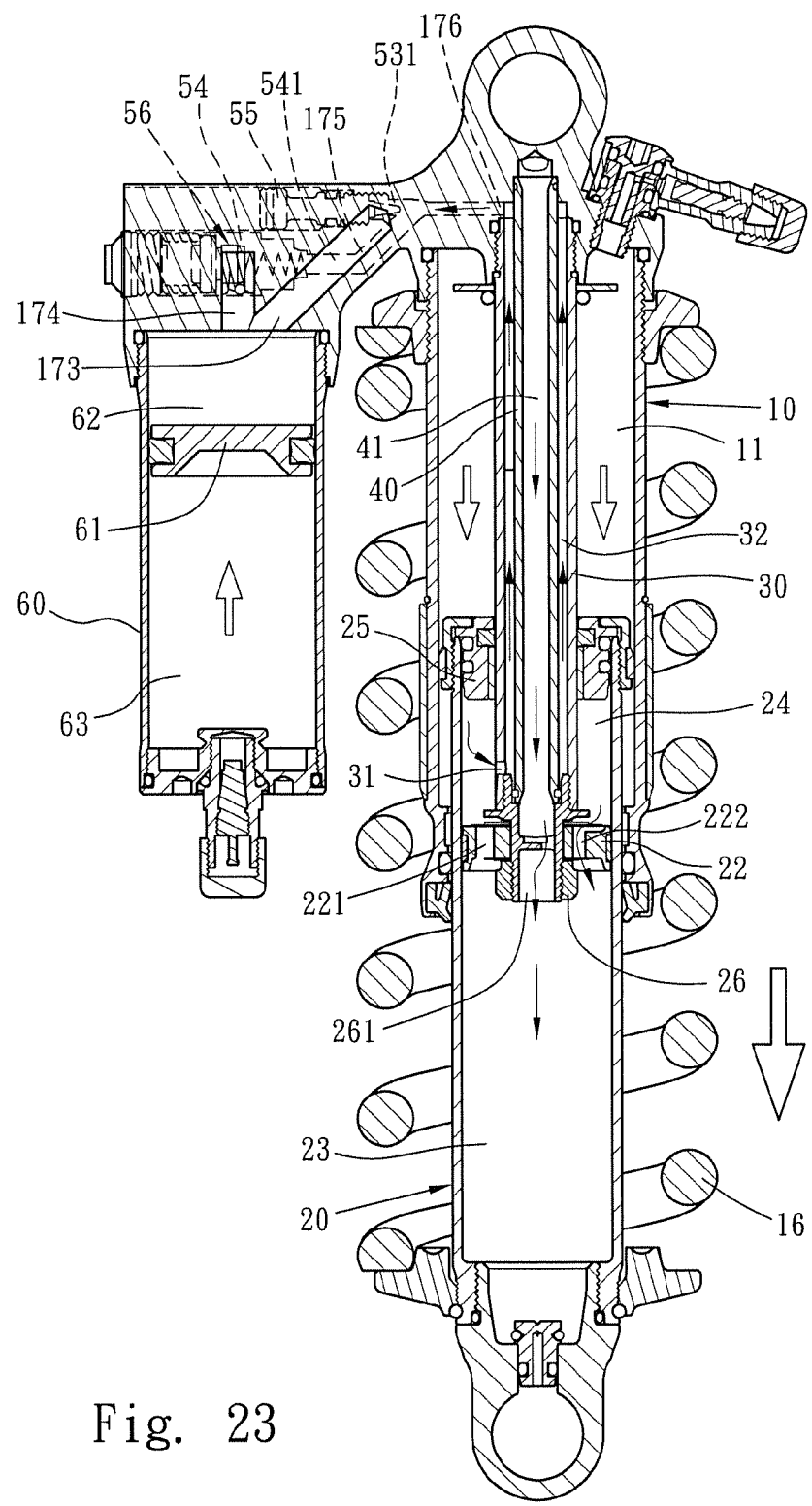
FIG. 23 shows that the fourth embodiment of the shock-absorbing device of the present invention returns.

When the shocks disappear, as shown in FIG. 23, the resilient member 16 bounces back and the pressurized air in the first room 11 provide a force to move the second cylinder 20 downward. The hydraulic liquid in the third room 24 is compressed and flows back to the second room 23 via the second hole 222, and a part of the hydraulic liquid enters into the first path 32 via the side hole 31, and flows into the eighth and seventh paths 176, 175 in sequence, and finally enters into the third and fourth pass holes 531, 541.

Figure 24:
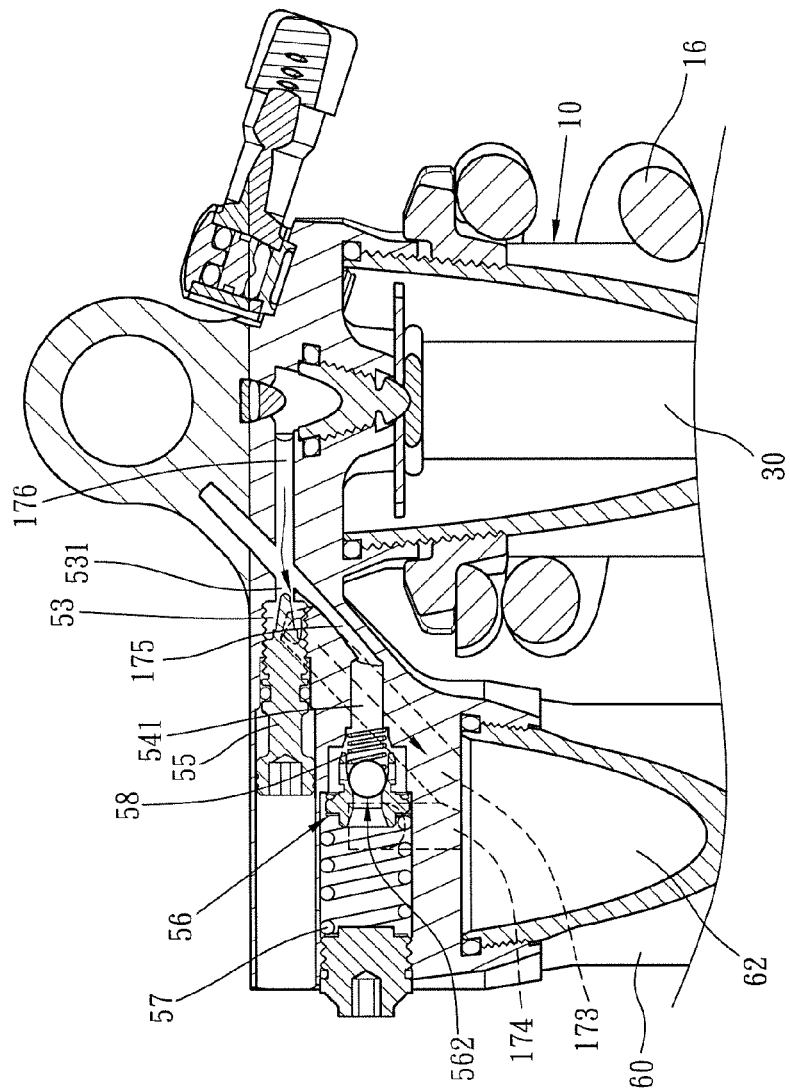
FIGS. 24 to 26 show the return reaction of the fourth embodiment of the shock-absorbing device of the present invention when the shock-absorbing device is applied by minor shocks.
Figure 25:
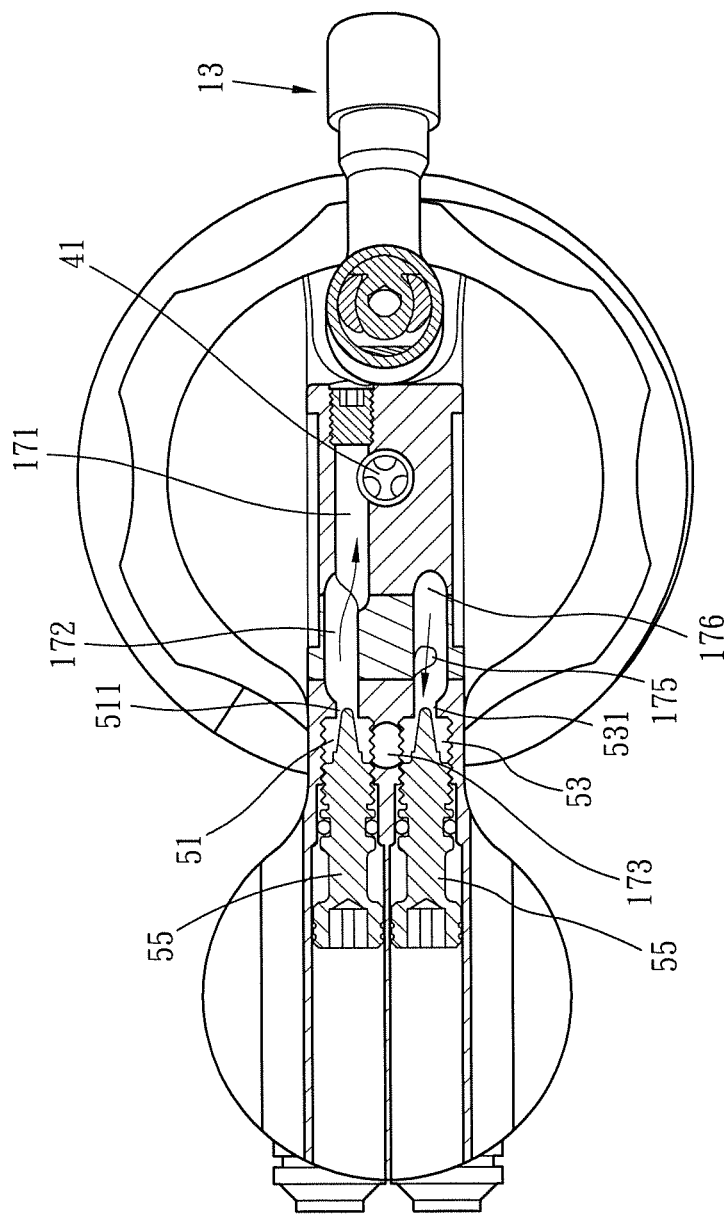
Figure 26:
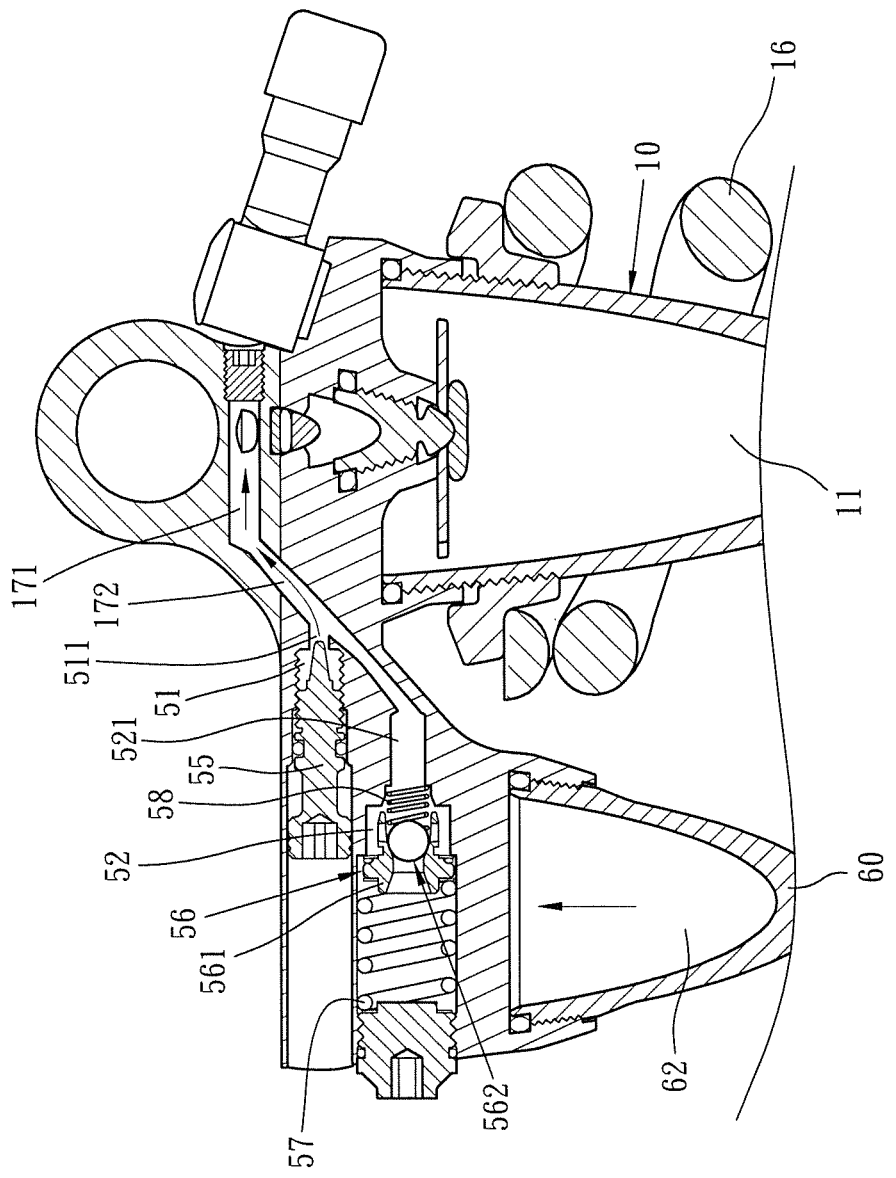
Figure 27:
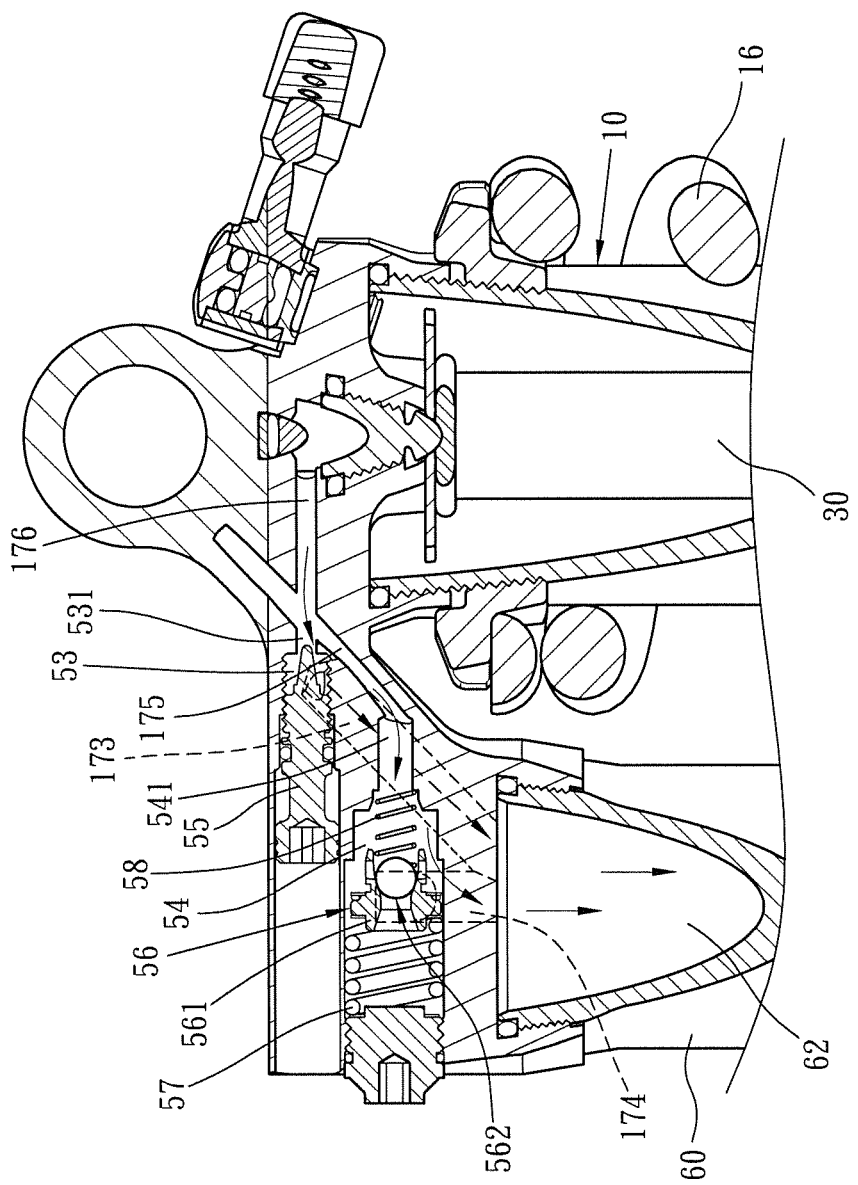
FIGS. 27 to 29 show the return reaction of the fourth embodiment of the shock-absorbing device of the present invention when the shock-absorbing device is applied by minor shocks.
Figure 28:
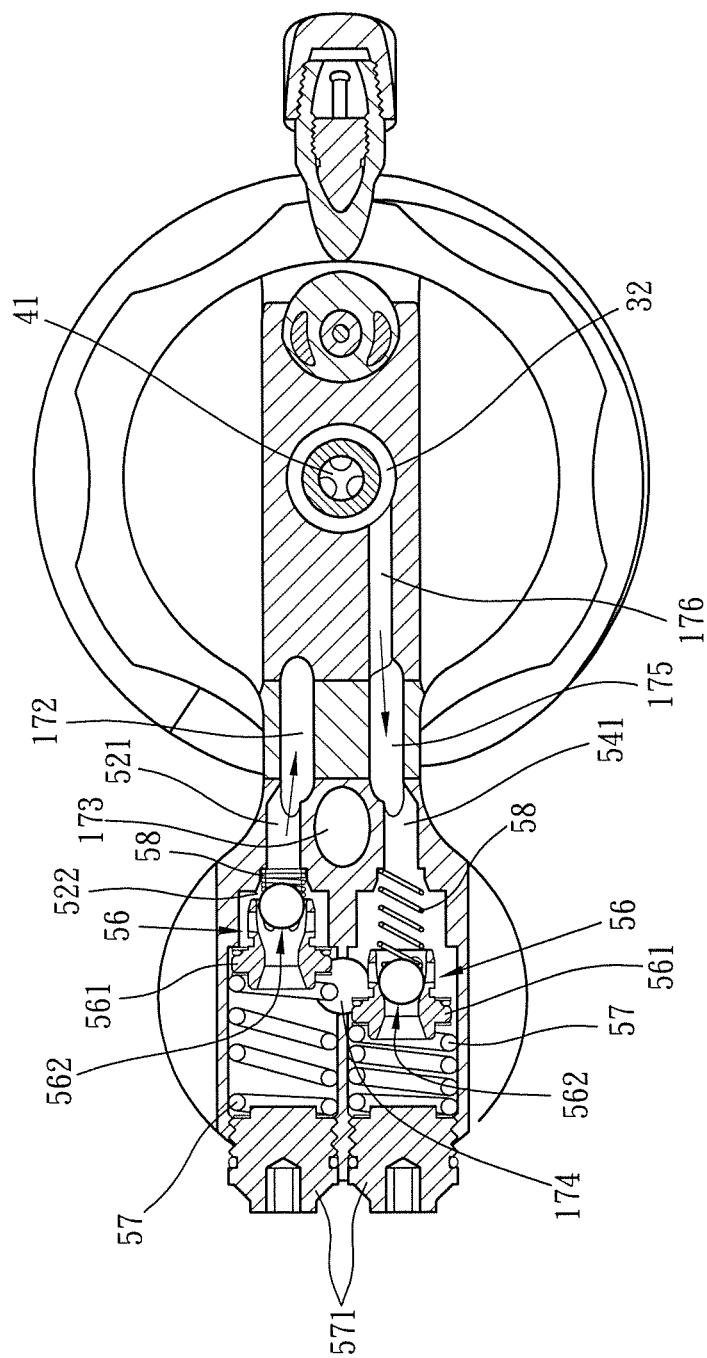
Figure 29:
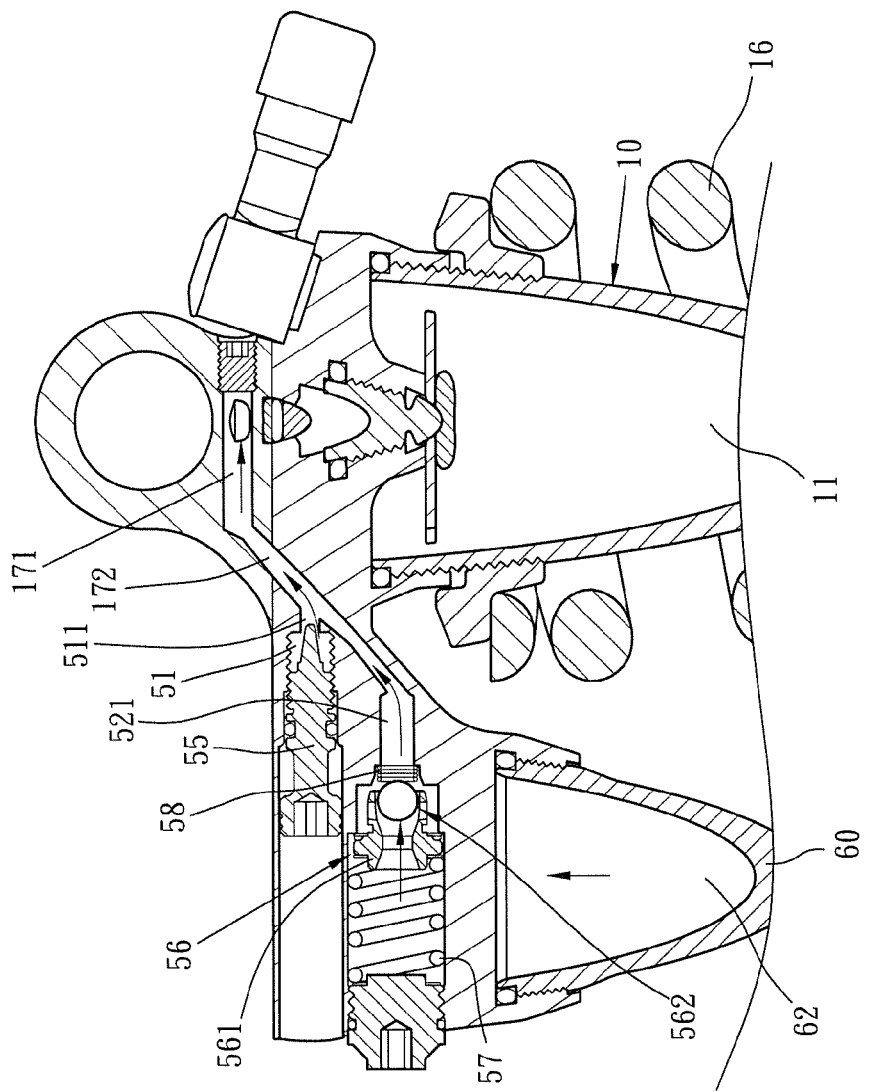

As shown in FIGS. 24 to 26, when minor shocks are applied to the rear shock-absorbing device, the hydraulic liquid enters into the third recess 53 via the third pass hole 531, and enters into the fourth room 62 via the fifth path 173. The second piston 61 is then pushed to compress the air in the fifth room 63. The pressurized air in the fifth room 63 generates a force to push the second piston 61 upward so that the hydraulic liquid in the fourth room 62 flows into the fifth and sixth paths 173, 174, and enters into the first and second recesses 51, 52. Because the shocks are minor, the seal valve 56 in the second recess 52 is not activated, the hydraulic liquid enters into the second room 23 from the first recess 51 via the first pass hole 511, the fourth and third paths 172, 171, and the second path 41.

When significant shocks are applied to the rear shock-absorbing device, significant amount of the hydraulic liquid enters into the gap 542 via the fourth pass hole 541 so as to move the body 561 of the seal valve 56 and the hydraulic liquid enters into the fourth recess 54 and the fourth room 62 via the sixth path 174. The second piston 61 is then pushed by the hydraulic liquid and the air in the fifth room 63 is compressed. When the pressure of the air in the fifth room 63 reaches a pre-set pressure, a force is generated to move the second piston 61 upward, so that the hydraulic liquid in the fourth room 62 enters into the fifth and sixth paths 173, 174, and respectively flows into the first and second recesses 51, 52. The impact of the hydraulic liquid is significant enough to activate the one-way valve 562 and compress the second resilient piece 58. The hydraulic liquid enters into the second room 23 from the second pass hole 521 via the fourth and third paths 172, 171 and the second path 41.

In the fourth embodiment, the hydraulic liquid slows at the center of the shock-absorbing device and is cooperated with the adjustment device 50 and the third cylinder 60, the first and second paths 32, 41 of the first and second tubes 30, 40 are cooperated with multiple recesses to allow the hydraulic liquid to flow in one direction only so as to form loops for absorbing different levels of shocks. The design of the shock-absorbing device is responsive to the shocks regardless the levels of the shocks and provides comfort riding to the cyclists. The movement of the plugs 15 controls the volume of the hydraulic liquid at the center of the device so that the return speed of the device is slower while the response speed of the device remains the same to ensure the comfort riding.

The first room 11 of the first cylinder 10 and the fifth room 63 of the third cylinder 60 form dual-room structure so as to adjust the pressure of the two rooms to increase the function of shock absorbing.

While we have shown and described the embodiment in accordance with the present invention, it should be clear to those skilled in the art that further embodiments may be made without departing from the scope of the present invention.

What is claimed is:

1. A rear shock-absorbing device comprising:
a first cylinder having a first room defined therein and a first installation unit connected to an end of the first cylinder, the first installation unit adapted to be connected to a bicycle frame, a recess defined in the first installation unit;
a second cylinder extending into the first room and having a second installation unit connected to an end thereof, the second installation unit adapted to be connected to a bicycle frame, a first piston located in the second cylinder so as to define a second room and a third room, the second room located close to the second installation unit, hydraulic liquid filled in the second and third rooms, a ring connected to an open end of the second cylinder and located away from the second installation unit;

a first tube being a hollow tube and extending through a center of the first room, the first tube having a first end connected with the first installation unit and a second end of the first tube extending through the second cylinder and the ring and connected to the first piston, a side hole defined through a wall of the first tube and located away from the first installation unit;

a second tube being a hollow tube and extending through the first tube so as to define a first path between the first and second tubes, the second tube having a second path defined centrally therethrough, the first and second paths communicating with the recess, when shocks are applied to the shock-absorbing device, the first and second cylinders move relatively and the first piston moves to open or close the side hole to control the hydraulic liquid to flow between the first and second paths;

wherein a resilient member is mounted to the first and second cylinders, the first installation unit has an adjustment device on a side thereof, the adjustment device has multiple recesses, multiple paths and a third cylinder, said multiple recesses comprise at least a first recess, a second recess, a third recess, and a fourth recess; a first recess and a second recess are radially defined in an inside of the first installation unit, a third recess and a fourth recess are radially defined in the inside of the first installation unit and located opposite to the first and second recesses, the first installation unit has a third path defined radially therein which communicates between the second path and a fourth path, the fourth path communicates with the first and second recesses, a fifth path is located between the first and third recesses, an end of the fifth path communicates with the first and third recesses, a sixth path is located between the second and fourth recesses, an end of the sixth path communicates with the second and fourth recesses, a seventh path is parallel to the fourth path, an eighth path is located radially in the first installation unit, an end of the eighth path communicates between the first and seventh paths, the third cylinder has a second piston received therein so as to define a fourth room and a fifth room, the fourth room located close to the first installation unit and the fifth room is located away from the fourth room, each of the fifth and sixth paths has an end away from the first installation unit and communicates with the fourth room, when shocks are applied to the shock-absorbing device, the first and second cylinders move relatively and the first piston moves to control the side hole to be open or close, and the movement of the hydraulic liquid flowing between the first and second paths and the third cylinder.

2. The device as claimed in claim 1, wherein the first installation unit has an air valve connected thereto so as to provide pressure and adjust pressure in the first room.

3. The device as claimed in claim 1, wherein the recess has a first through hole defined radially therein and the first installation unit has a second through hole defined in a center thereof, a passage defined between the recess and the second through hole, the second path communicates with the second through hole.

4. The device as claimed in claim 3, wherein the recess has a plug located therein which has a cone-shaped section to control the passage.

5. The device as claimed in claim 1, wherein the first tube has an inclined notch defined in an end located away from the first installation unit, the notch communicates with the side hole.

6. The device as claimed in claim 1, wherein each of the first and third recesses has a plug received therein and each of the second and fourth recesses has a seal valve received therein, the first recess has a first pass hole defined in a side thereof which is located close to the first cylinder, the second recess has a second pass hole defined in a side thereof which is located close to the first cylinder, the third recess has a third pass hole defined in a side thereof which is located close to the first cylinder, the fourth recess has a fourth pass hole defined in a side thereof which is located close to the first cylinder, each plug has a cone-shaped section located in the first and third pass holes, respectively, so as to control volume passing through the first and third pass holes.

7. The device as claimed in claim 6, wherein each of the second and fourth recesses has the seal valve and a first resilient piece, the first resilient piece is located in an end of the seal valve corresponding thereto and located away from the second and fourth pass holes, a second resilient piece is located between each seal valve and the second and fourth pass holes.

8. The device as claimed in claim 7, wherein each of the seal valves is biased by each second resilient piece so as to form a gap in the second and fourth recesses, respectively.

9. The device as claimed in claim 6, wherein each of the seal valves includes a body and a one-way valve, each one-way valve is located at connection portion between the second recess, the fourth recess, the second pass hole and the fourth pass hole.

10. The device as claimed in claim 7, wherein a spring force of each second resilient piece is smaller than that of each first resilient piece, an adjusting member is connected to each first resilient piece and located away from the respective seal valve so as to control compression of each first resilient piece and volume passing through the respective seal valve.

11. The device as claimed in claim 1, wherein the fourth path is an inclined path and communicates with the first and second pass holes, the fifth path is parallel to the fourth path, the fifth path communicates with the first and third pass holes, the seventh path is parallel to the fourth path, the seventh path communicates with the third and fourth pass holes.

12. The device as claimed in claim 1, wherein the third cylinder has an air valve connected thereto which provides and adjusts pressure in the fifth room.

13. The device as claimed in claim 1, wherein the first piston has multiple holes defined axially therein so as to form a valve.

14. The device as claimed in claim 13, wherein the first piston includes a first hole and a second hole, the first hole is a one-way valve allowing hydraulic liquid to flow from the second room to the third room, the second hole is a one-way valve allowing hydraulic liquid to flow from the third room into the second room.

15. The device as claimed in claim 1, wherein the first installation unit of the first cylinder is connected to the second installation unit of the second cylinder.

\* \* \* \* \*